US011714271B2

(12) United States Patent
Cang et al.

(10) Patent No.: US 11,714,271 B2
(45) Date of Patent: Aug. 1, 2023

(54) METHODS AND SYSTEMS FOR MULTIDIMENSIONAL IMAGING

(71) Applicant: Singular Genomics Systems, Inc., La Jolla, CA (US)

(72) Inventors: Hu Cang, San Diego, CA (US); Eli N. Glezer, Del Mar, CA (US)

(73) Assignee: Singular Genomics Systems, Inc., San Diego, CA (US)

( * ) Notice: Subject to any disclaimer, the term of this patent is extended or adjusted under 35 U.S.C. 154(b) by 0 days.

(21) Appl. No.: 17/691,731

(22) Filed: Mar. 10, 2022

(65) Prior Publication Data

US 2022/0197002 A1 Jun. 23, 2022

Related U.S. Application Data

(63) Continuation of application No. PCT/US2021/050077, filed on Sep. 13, 2021.
(Continued)

(51) Int. Cl.
*G01N 21/64* (2006.01)
*G02B 21/02* (2006.01)
(Continued)

(52) U.S. Cl.
CPC ......... *G02B 21/02* (2013.01); *G01N 21/6402* (2013.01); *G01N 21/6458* (2013.01);
(Continued)

(58) Field of Classification Search
CPC ............... G02B 21/02; G02B 21/0032; G02B 21/0076; G02B 21/008; G02B 27/106;
(Continued)

(56) References Cited

U.S. PATENT DOCUMENTS 5,847,400 A    12/1998   Kain et al.
6,248,988 B1 *   6/2001   Krantz ............... G02B 21/0072
                                                                        250/201.3

(Continued)

FOREIGN PATENT DOCUMENTS

WO   WO1999/047963    9/1999
WO   WO2006/127967    11/2006
(Continued)

OTHER PUBLICATIONS

Carpenter A. et al. (Oct. 31, 2006). "CellProfiler: image analysis software for identifying and quantifying cell phenotypes." Genome Biology, 7:R100.

(Continued)

*Primary Examiner* — David P Porta
*Assistant Examiner* — Djura Malevic
(74) *Attorney, Agent, or Firm* — Mintz, Levin, Cohn, Ferris, Glovsky, Popeo, P.C.

(57) ABSTRACT

A multi-depth confocal imaging system includes at least one light source configured to provide excitation beams and an objective lens. The excitation beams are focused into a sample at a first plurality of focus depths along an excitation direction through the objective lens. An image sensor receives emissions from the sample via the objective lens, wherein the emissions define foci relative to the image sensor at a second plurality of focus depths.

30 Claims, 16 Drawing Sheets

Related U.S. Application Data

(60) Provisional application No. 63/077,852, filed on Sep. 14, 2020.

(51) Int. Cl.
    *G02B 21/00*      (2006.01)
    *G02B 27/10*      (2006.01)
    *G02B 6/04*      (2006.01)

(52) U.S. Cl.
    CPC ....... *G02B 21/008* (2013.01); *G02B 21/0032* (2013.01); *G02B 21/0076* (2013.01); *G02B 27/106* (2013.01); *G01N 2021/6463* (2013.01); *G01N 2021/6484* (2013.01); *G02B 6/04* (2013.01); *G02B 21/0036* (2013.01)

(58) Field of Classification Search
    CPC ...... G02B 6/04; G02B 21/0036; G02B 21/00; G02B 21/22; G01N 21/6402; G01N 21/6458; G01N 2021/6463; G01N 2021/6484; G01N 21/64; A61B 5/00
    See application file for complete search history.

(56) References Cited

U.S. PATENT DOCUMENTS

| | | | |
|---|---|---|---|
| 6,309,601 B1 | 10/2001 | Juncosa et al. | |
| 6,381,074 B2* | 4/2002 | Yoshida | G02B 26/06 359/728 |
| 6,788,456 B2* | 9/2004 | Knebel | G02B 21/002 359/368 |
| 6,867,406 B1* | 3/2005 | Fairley | G02B 21/0024 250/201.3 |
| 6,958,858 B2* | 10/2005 | Engelhardt | G02B 21/002 359/388 |
| 7,057,026 B2 | 6/2006 | Barnes et al. | |
| 7,109,458 B2* | 9/2006 | Fairley | G02B 3/0056 250/201.3 |
| 7,257,289 B2* | 8/2007 | Olschewski | G01J 3/2823 385/27 |
| 7,399,950 B2* | 7/2008 | Fairley | G02B 3/0056 250/201.3 |
| 7,450,243 B2* | 11/2008 | Marks | A61B 5/0086 356/497 |
| 7,460,248 B2* | 12/2008 | Kurtz | G01N 21/6486 356/497 |
| 7,541,444 B2 | 6/2009 | Milton et al. | |
| 7,560,709 B2* | 7/2009 | Kimura | G02B 21/002 250/458.1 |
| 7,738,945 B2* | 6/2010 | Fauver | G01N 21/05 382/133 |
| 7,787,112 B2* | 8/2010 | Rahn | G01N 21/4795 356/213 |
| 7,858,911 B2* | 12/2010 | Fairley | G02B 27/40 250/201.3 |
| 7,863,552 B2* | 1/2011 | Cartlidge | G01N 21/9501 359/368 |
| 7,907,765 B2* | 3/2011 | Fauver | G01N 15/1475 382/131 |
| 7,933,010 B2* | 4/2011 | Rahn | G01N 21/4795 356/213 |
| 8,143,600 B2* | 3/2012 | Seibel | G06T 11/006 250/461.2 |
| 8,254,023 B2* | 8/2012 | Watson | G01N 21/4795 359/380 |
| 8,351,675 B2* | 1/2013 | So | G06V 20/69 382/133 |
| 8,575,570 B2* | 11/2013 | Choi | G01N 21/6458 359/368 |
| 8,705,172 B2* | 4/2014 | Kleppe | G02B 21/0036 359/385 |
| 8,773,760 B2* | 7/2014 | Gmitro | G02B 21/0028 359/388 |
| 8,982,206 B2* | 3/2015 | Raicu | G02B 27/0927 348/79 |
| 9,057,879 B2* | 6/2015 | Knebel | G02B 21/002 |
| 9,696,264 B2* | 7/2017 | Lange | G01N 21/9501 |
| 10,139,608 B2* | 11/2018 | Huang | G02B 21/16 |
| 10,310,248 B2* | 6/2019 | Brinkman | G01N 21/6458 |
| 10,754,135 B2* | 8/2020 | Shimada | G01J 1/44 |
| 10,852,520 B2* | 12/2020 | Hillman | G02B 21/0048 |
| 10,884,227 B2* | 1/2021 | Tomer | G02B 21/367 |
| 10,955,652 B2* | 3/2021 | Hillman | G02B 27/0927 |
| 11,022,788 B2* | 6/2021 | Fahrbach | G02B 21/16 |
| 11,243,115 B2* | 2/2022 | Arbore | G01J 3/42 |
| 11,262,306 B2* | 3/2022 | Gao | G02B 21/367 |
| 11,320,640 B2* | 5/2022 | Keller | G02B 21/32 |
| 2002/0104961 A1* | 8/2002 | Hoffman | G02B 21/0032 250/234 |
| 2003/0151742 A1 | 8/2003 | Silvermintz et al. | |
| 2007/0087284 A1* | 4/2007 | Fleming | B33Y 30/00 430/1 |
| 2007/0183029 A1* | 8/2007 | Iketaki | G02B 21/0032 359/385 |
| 2008/0043786 A1* | 2/2008 | Wilhelm | G02B 21/0032 372/20 |
| 2008/0225379 A1* | 9/2008 | Mescher | G02B 26/0825 359/666 |
| 2009/0174935 A1* | 7/2009 | Szulczewski | G02B 21/0048 359/368 |
| 2010/0053743 A1* | 3/2010 | Galimberti | G02B 21/006 359/201.2 |
| 2010/0264294 A1* | 10/2010 | Stallinga | G02B 3/0006 250/201.3 |
| 2010/0277580 A1* | 11/2010 | Stallinga | G02B 27/0087 359/385 |
| 2010/0309548 A1* | 12/2010 | Power | G02B 21/008 359/385 |
| 2011/0059865 A1 | 3/2011 | Smith et al. | |
| 2011/0115895 A1* | 5/2011 | Huisken | G02B 21/06 359/385 |
| 2011/0122488 A1* | 5/2011 | Truong | G02B 21/16 359/385 |
| 2011/0235966 A1* | 9/2011 | Mescher | G02B 26/0825 29/25.35 |
| 2012/0141981 A1* | 6/2012 | Pantazis | A61B 5/0075 435/7.1 |
| 2013/0342674 A1 | 12/2013 | Dixon | |
| 2014/0066318 A1 | 3/2014 | Frisen et al. | |
| 2015/0029386 A1 | 1/2015 | Pitts et al. | |
| 2016/0363538 A1* | 12/2016 | Dutertre | G02B 21/16 |
| 2017/0302827 A1* | 10/2017 | Shimada | G02B 21/02 |
| 2017/0371136 A1* | 12/2017 | Shimada | G02B 21/0032 |
| 2018/0052314 A1* | 2/2018 | Brinkman | G02B 21/22 |
| 2018/0314047 A1* | 11/2018 | Shimada | G02B 21/0076 |
| 2019/0271647 A1* | 9/2019 | Grabmayr | G01N 21/6428 |
| 2020/0041778 A1* | 2/2020 | Dholakia | G02B 21/086 |
| 2020/0142170 A1* | 5/2020 | Cai | G01N 21/6458 |
| 2021/0011266 A1* | 1/2021 | Hamilton | G02B 21/0076 |
| 2021/0169336 A1* | 6/2021 | Sanchez | A61B 5/444 |
| 2021/0239955 A1* | 8/2021 | Dai | G02B 21/0076 |
| 2022/0007943 A1* | 1/2022 | Sanchez | G06T 7/0012 |
| 2022/0197002 A1* | 6/2022 | Gang | G01N 21/6458 |

FOREIGN PATENT DOCUMENTS

| | | | | |
|---|---|---|---|---|
| WO | WO2007/062039 | 5/2007 | | |
| WO | WO 2020/102442 | 5/2020 | | |
| WO | WO-2020102442 A1 * | 5/2020 | ........... | A61B 5/0071 |

OTHER PUBLICATIONS

Acre, S. et al. (2013) "Fast and accurate automated cell boundary determination for fluorescence microscopy." Sci Rep, 3:2266.

Magaki, S. et al. (2019) "An Introduction to the Performance of Immunohistochemistry." Methods in molecular biology, 1897:289-298.

Lugagne, J-B. et al. (2018) "Identifcation of individual cells from z-stacks of bright-feld microscopy images." Sci Rep, 8:11455.

(56) References Cited

OTHER PUBLICATIONS

Pattarone, G. et al. (2021) "Learning deep features for dead and living breast cancer cell classifcation without staining." Sci Rep, 11:10304.

* cited by examiner

METHODS AND SYSTEMS FOR MULTIDIMENSIONAL IMAGING

CROSS-REFERENCE TO RELATED APPLICATIONS

This application is a continuation of PCT/US2021/050077, filed Sep. 13, 2021, which claims the benefit of U.S. Provisional Application No. 63/077,852, filed Sep. 14, 2020, which are incorporated herein by reference in their entirety and for all purposes.

BACKGROUND

Biological imaging in physiologically relevant systems, such as whole organisms, tissues, and cells, typically requires sophisticated optics techniques and hardware. For example, Light Sheet Fluorescence Microscopy (LSFM) is a technique that has evolved over the decades since being introduced in 1994. The LSFM technique decouples illumination from observation by detecting fluorescence on an orthogonal axis to the incident light.

Compared to traditional epifluorescent modalities, LSFM utilizes lower illumination intensities thus minimizing photodamage to the analyzed sample. LSFM further permits scanning in multiple axial directions thus allowing for rapid 3D imaging and mid-to-high optical resolution. However, LSFM systems are infamous for being difficult to implement, typically requiring two or more objectives, non-standard sample preparation protocols, difficult alignment procedures, and a complicated workflow and computer storage to handle the terabytes of data generated during image acquisition. Technological advances are required to minimize photodamage and phototoxicity while capturing information at sufficient optical resolution, often in multiple dimensions (e.g., x, y, z, t).

SUMMARY

Disclosed herein are improved fluorescent microscopy systems and techniques, as well as solutions to the aforementioned problems and other problems in the art.

In one aspect, an imaging system is disclosed. In non-limiting example embodiments, the imaging system includes a light source that illuminates a sample, an objective lens, and a sensor array (e.g., complementary metal-oxide-semiconductor (CMOS) array or a charge-coupled device (CCD) array), wherein the sample is on a sample stage, and the sensor array is on a detection stage.

In another aspect, there is disclosed a method of imaging a sample. In embodiments, the method includes illuminating a sample at a plurality of depths and detecting light from the sample (e.g., fluorescent excitation events, scattered light, transmitted light, or reflected light) at an active-pixel sensor array, and scanning the sample. In embodiments, the method includes illuminating a sample at a plurality of depths to generate fluorescent events, detecting each fluorescent event at an active-pixel sensor array, and scanning the sample.

In another aspect, there is disclosed a multi-depth confocal imaging system, comprising: at least one light source configured to provide excitation beams; an objective lens, wherein the excitation beams are focused into a sample at a first plurality of focus depths (e.g., two or more different depths, such as 2-10 different depths, 4-12 different depths, 5-8 different depths) along an excitation direction through the objective lens; and an image sensor that receives emissions (e.g., light beams, such as excited emissions, fluorescent excitation emissions, scattered light emissions, transmitted light emissions, or reflected light emissions) from the sample via the objective lens, wherein the emissions define foci relative to the image sensor at a second plurality of focus depths. In embodiments, at least a portion of the image sensor is positioned at an oblique orientation relative (e.g., at a non-perpendicular angle) to the optical axis of the objective lens.

In another aspect, there is disclosed a multi-depth confocal imaging system, comprising: at least one light source; and a plurality of optic fibers that receive excitation light from the plurality of light sources, where the optic fibers are spatially arranged to introduce excitation light into a sample at a plurality of depths within the sample (e.g., wherein the number of optic fibers relates to the number of depths within the sample).

In another aspect, there is disclosed a method of generating a two- or three-dimensional image of a sample, comprising: introducing excitation beams into a sample along an excitation direction, the excitation beams being focused at a plurality of depths in the sample; focusing a corresponding plurality of emissions (e.g., light beams, such as excited emissions, fluorescent excitation emissions, scattered light emissions, transmitted light emissions, or reflected light emissions) on an image sensor, wherein the emissions are focused at a plurality of depths relative to the image sensor; and scanning the sample along a direction orthogonal to the excitation direction to obtain a plurality of planar images of the sample, the planar images defining multiple depths of the sample. In embodiments, the image sensor is oriented at an oblique angle relative to an excitation direction.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIG. 12C shows a staggered pinhole array providing illumination patterns at alternating depths. FIG. 12D shows a segmented mirror approach, wherein a reflective surface is attached to movable posts (e.g., actuators) and the post heights are varied to achieve the desired illumination depths.

DETAILED DESCRIPTION

Figure 1:
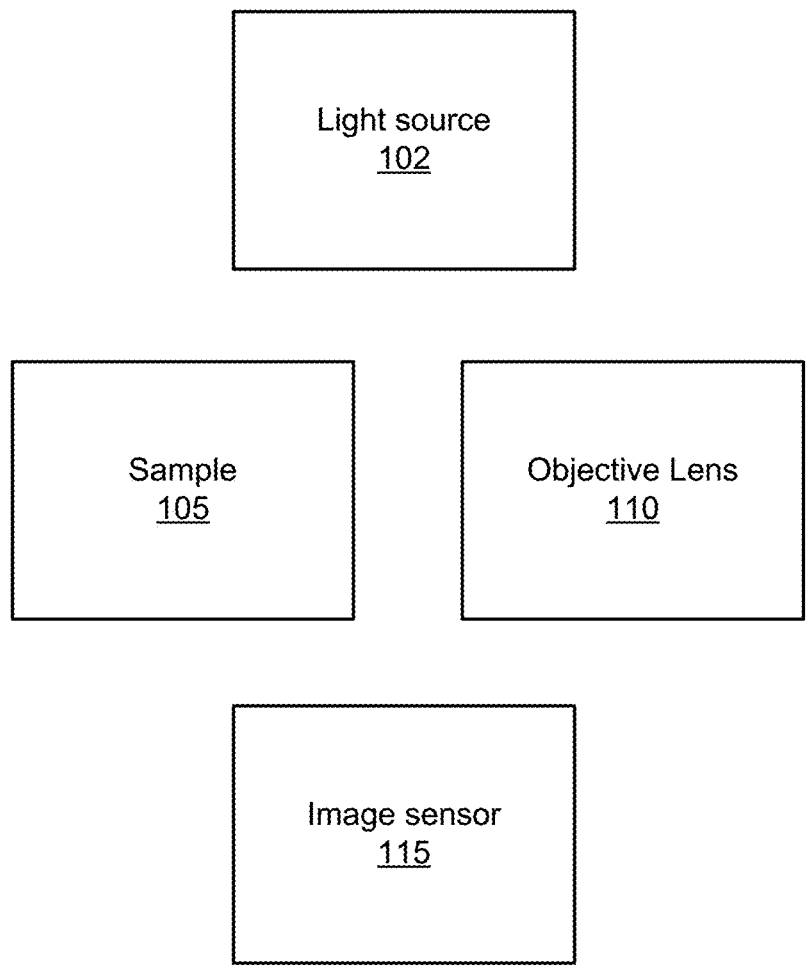
FIG. 1 shows a schematic representation of an imaging system.

Multidimensional (e.g., two-dimensional (2D) or three-dimensional (3D)) fluorescence imaging plays keys roles in drug discovery, disease diagnosis, and materials inspections. Standard methods typically include imaging a sample in three dimensions, referred to as confocal microscopy. A confocal microscopy imaging technique focuses excitation light to a diffraction-limited spot of the sample, passes the emitted fluorescence through an aperture (e.g., a pinhole) placed in a conjugate image plane, and collects the emission. The aperture rejects out of focus emission light to enable an optical sectioning ability. By scanning the sample or the excitation focus in 3D, a volumetric image is generated. However, such a scanning method is slow and requires repeated scanning of the sample with high-intensity laser illumination, which can cause significant photodamage to the sample.

Multi-foci scanning confocal microscopes were developed to accelerate the speed of image acquisition. They employ parallelized methods to simultaneously scan multiple diffraction-limited excitation spots forming an array of excitation spots across the sample or a continuous line in 1-dimension. However, these methods also image one plane at a time, i.e., the multiple foci or the line focus are limited to the same focal plane. Hence, multiple images must be taken at different Z positions to generate a 3-dimensional volumetric view of the sample, which limits the throughput of the imaging and can photodamage the sample.

As discussed, LSFM has emerged as a promising alternative to confocal fluorescent microscopy for 3D imaging. The light-sheet microscopy illuminates a sample with a plane of light instead of a point or a line. The LSFM technique can acquire 3D images faster than confocal microscopy. However, conventional LSFM microscopes require using two separate objectives on the sample side, one objective for illumination and the other objective for detection. The objectives are positioned in an orthogonal arrangement. The arrangement of two objective lens in orthogonal relationship to each other can require a significant amount of space, which make the light-sheet microscopy technique difficult to image many samples, particularly where space is lacking. Additionally, LSFM requires difficult alignment procedures and a complicated workflow and computer storage to handle the terabytes of data generated during image acquisition.

Oblique plane light-sheet microscopy was developed to overcome the space limitation of conventional light-sheet microscopy for applications in which a lack of space does not allow the sample to be imaged by two objective lenses. In an oblique plane light-sheet microscope, the light sheet is focused into the sample and imaged at an oblique angle relative to the axis of the objective lens. Although oblique-plane light allows access to fluorescence-based microscopic light sheet imaging in samples that are not possible to image by means of a conventional light sheet microscope having two objectives, it has some disadvantages. In particular, the light-sheet must be introduced to the sample from the same objective lens at 90 degree relative the imaging plane. To achieve such illumination requires using objective lens with high numerical aperture (NA). In a non-limiting example, an aperture of greater than 1.0 is considered as a high numerical aperture. In a non-limiting example, an aperture of greater than 1.4 is considered as a high numerical aperture. Such high NA objective lenses require immersion oil between the front surface of the objective lens and the sample. Therefore, typical implementations of oblique-plane light-sheet microscopy is limited and cannot typically be applied to image samples that cannot use immersion oil. In embodiment, the objective lens includes a numerical aperture less than 1.0. In embodiments, the objective lens includes a numerical aperture of 0.1 to 1.65. In embodiments, the objective lens includes a numerical aperture of 0.1 to 0.95. In embodiments, the objective lens includes a numerical aperture of 1.0 to 1.65. In embodiments, the objective lens includes a numerical aperture of at least 0.2, 0.3, 0.4, or 0.5. In embodiments, the objective lens includes a numerical aperture is no greater than 0.8, 0.7, 0.6 or 0.5. In embodiments, the objective lens includes a numerical aperture is no greater than 1.4, 1.3, 1.2, 1.1, or 1.0.

The disclosed systems and methods overcome the difficulties of the oblique-plane microscopy, such as the need for a high-NA immersion type of objective lens to image the sample, and also addresses the low throughout obstacles found in typical confocal microscopy systems. Higher magnification objective lenses generally have shallower depth of field. For example, a 100× objective lens with a numerical aperture of about 1.4 has a depth of field of approximately 1 µm. When observing a sample using the devices and methods described herein, the limitations of the shallow depth of field are easy to circumvent by simultaneously obtaining images of multiple focal depths to effectively present image data of a complex 3D structure in 2D planes.

Compared with previous confocal microscopy methodologies and systems, the systems and methods described herein significantly increase the throughput by concurrently imaging the sample at multiple depths. In contrast to oblique-plane light-sheet microscopy, the disclosed system achieves similar throughput via the multi-depth concurrent imaging, but also eliminates the need for a high-NA immersion type of objective by using a multi-confocal type of excitation. The seamless integration of confocal excitation and oblique-plane observation provides a synergic advantage and allows achieve both high-throughput imaging without limiting the type of applicable samples.

Figure 2:
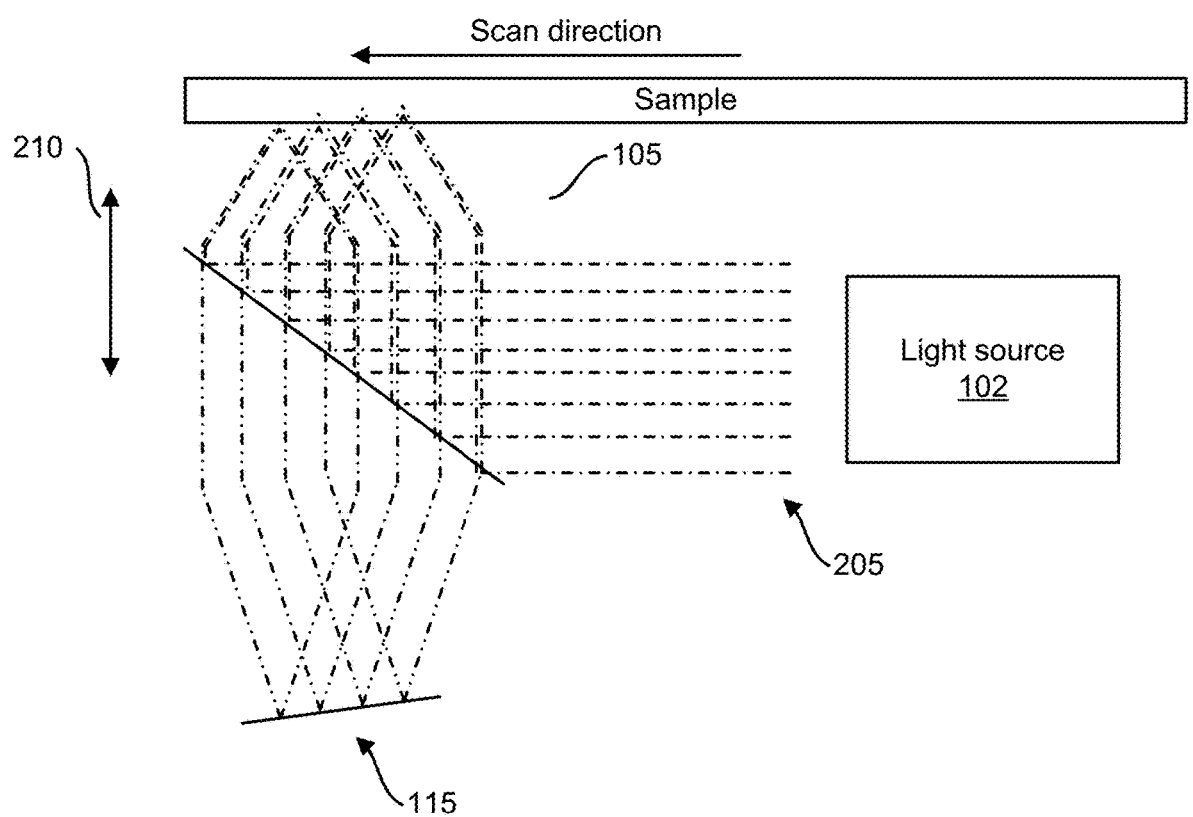
FIG. 2 shows another schematic representation of the imaging system.

FIGS. 1 and 2 show schematic representations of an imaging system that includes an illuminator or light source 102, a sample 105, an objective lens 110, and an image sensor 115, which can be an array detector or camera. In embodiments, the illuminator or light source is a radiation source (i.e., an origin or generator of propagated electromagnetic energy) providing incident light to the sample. A radiation source can include an illumination source producing electromagnetic radiation in the ultra violet (UV) range (about 200 to 390 nm), visible (VIS) range (about 390 to 770 nm), or infrared (IR) range (about 0.77 to 25 microns), or other range of the electromagnetic spectrum. In embodiments, the illuminator or light source is a lamp such as an arc lamp or quartz halogen lamp. In embodiments, the illuminator or light source is a coherent light source.

In embodiments, the light source is a laser, LED (light emitting diode), a mercury or tungsten lamp, or a super-continuous diode. In embodiments, the light source provides excitation beams having a wavelength between 200 nm to 1500 nm. In embodiments, the laser provides excitation beams having a wavelength of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm. In embodiments, the laser provides excitation beams having a wavelength of 405 nm, 488 nm, 532 nm, or 633 nm.

In embodiments, the illuminator or light source is a light-emitting diode (LED). The LED can be, for example, an Organic Light Emitting Diode (OLED), a Thin Film Electroluminescent Device (TFELD), or a Quantum dot based inorganic organic LED. The LED can include a phosphorescent OLED (PHOLED).

In embodiments, the light source provides one or more excitation beams. An excitation beam is intended to mean electromagnetic energy propagated toward a sample or sample region. An excitation beam may be shaped such that the collection of electromagnetic waves or particles are propagated in a uniform direction, wherein the 2-dimensional cross section orthogonal to the direction of propagation is rectangular or oblong. Exemplary 2-dimensional cross sections of an excitation beam can include a rectangular, elliptical, or oval shape. The cross sectional width of an excitation beam can have one or both dimensions in a range of, for example, about 0.05 µm to about 10 µm. For example, a dimension of the excitation beam can be at least about 0.05 µm, 0.1 µm, 0.5 µm, 1 µm, 5 µm or 10 µm. Furthermore, a dimension of a excitation beam can be, for example, at most about 0.1 µm, 0.5 µm, 1 µm, 5 µm or 10 µm. It will be understood that these dimensions are merely exemplary and excitation beams having other dimensions can be used if desired.

In embodiments, the light source is a laser (e.g., a laser such as a solid state laser or a gas laser). In embodiments, the light source includes one or more vertical cavity surface emitting lasers (VCSELs), vertical external cavity surface emitting lasers (VECSELs), or diode pumped solid state (DPSS) lasers. In embodiments, the light source is a continuous wave (CW) laser or a pulsed laser. In embodiments, the light source is a pulsed laser. In embodiments, the light source is an ultrashort pulsed laser. An ultrashort laser is a laser capable of producing excitation beams for a time duration of a picosecond or less. An ultrashort laser typically includes additional components, such as a pulse controller, pulse shaper, and spatial light modulator, and the like for controlling the pulse of excitation beams. In embodiments, the ultrashort laser provides excitation beams for femtoseconds or picoseconds. In embodiments, the light source is a pulsed femtosecond or picosecond laser. In embodiments, the laser is a Ti-sapphire laser, a dye-laser, or a fiber laser. In embodiments, the system includes two or more light sources (e.g., lasers). In embodiments, the first light source configured to emit light in red wavelengths, and a second light source configured to emit light in green wavelengths. In embodiments, the system includes two or more lasers.

The system may also include other components, including a collection of lenses (such as a collimating lens, a beam shaping lens (e.g., Powell lens), and a cylindrical lens), mirrors (e.g., a dichromatic mirror), beam splitter(s), one or more pinhole apertures, excitation filter, or combinations thereof. For example, the direction, size, and/or polarization of the light source may be adjusted by using lenses, mirrors, and/or polarizers. In embodiments, one or more of the components of the system may be adjusted or manipulated automatically. Automatic control devices may include a motorized translation stage, an actuation device, one or more piezo stages, and/or one or more automatic switch and flip mirrors and lenses. In embodiments, the system includes one or more optical components (e.g., a beam shaping lens) configured to shape the light emitted from the one or more light sources into desired patterns. For example, in some embodiments, the optical components may shape the light into line patterns (e.g., by using one or more Powell lenses, or other beam shaping lenses, diffractive, or scattering components). In embodiments, the optical component includes a line generator. A "line generator" as used herein refers to an optical component that is configured to generate a diffraction-limited or near diffraction-limited excitation beam in the plane perpendicular to the optical axis of propagation with a substantially uniform intensity distribution along the horizontal axis of the line. Exemplary line generators include, but are not limited to, a one dimensional diffuser having angular uniformity, cylindrical micro-lens array, diffractive element or aspheric refractive lens such as a Powell lens. In embodiments, the optical components include a Powell lens, a micro-lens, or micro-lens array. In embodiments, the optical component includes a micro-lens fabricated on glass, metal, or plastic. In embodiments, the excitation beams may be directed through a beam shaping lens or lenses. In some embodiments, a single beam shaping lens may be used to shape the excitation beams output from a plurality light sources (e.g., 2 light sources). In some embodiments, a separate beam shaping lens may be used for each light beam. In embodiments, the beam shaping lens is a Powell lens, alternatively referred to as a Powell prism. The shape of the beam may be shaped into an appropriate geometry according to known techniques, e.g., a line, conical, super-Gaussian, ring, doughnut, Bessel-Gauss, Hermite-Gaussian, Laguerre-Gaussian, Hypergeometric-Gaussian, Ince-Gaussian, and the like. In embodiments, the beam is uniform within acceptable limits (e.g., less than 30% intensity variation across the beam). In embodiments, the beam is profiled or includes a gradient.

It should be appreciated that the elements of the system can each be a discrete structure or multiple elements can be combined into a common structure. The sample 120 can be positioned on a sample stage and the image sensor 115 can be positioned on a detection stage. In embodiments, the sample stage is mobile (e.g., capable of at least moving in the xy plane). In embodiments, the sample stage is a motorized translation stage. In embodiments, the sample stage is configured to receive and retain a microplate receiver and/or a microplate. In embodiments, the sample stage is configured to receive and retain a microplate receiver and a microplate containing a sample. In embodiments, the device further includes one or more "fascia plates", or covers, that hides fasteners, circuit boards, and similar delicate components, protecting them from dust and/or human contact, and providing visual appeal. In an example embodiment, the image sensor 115 includes one or more active-pixel sensor arrays (e.g., CMOS array, or a CCD array, or combination thereof). In an example embodiment, the image sensor 115 includes a plurality of active-pixel sensor arrays (e.g., CMOS array, or a CCD array, or combination thereof). In an example embodiment, the image sensor 115 is an active-pixel sensor array (e.g., CMOS array, or a CCD array, or combination thereof). In embodiments, the image sensor is a CMOS array. A CMOS array, alternatively referred to as a CMOS camera, typically use an active-pixel sensor (APS) that is an image sensor comprising of an integrated circuit containing an array of pixels, where each pixel includes a photodetector and an active amplifier. In embodiments, the image sensor includes a PIN photodiode, a CCD array, a CMOS array, a line scanner, a photodiode, a phototransistor, a photomultiplier, or an avalanche photodiode. In embodiments, the image sensor is a CCD array. In embodiments, the image sensor includes a confocal time delay and integration (TDI) line scan imaging system that has high S/N ratio and high confocality for producing high resolution images of a sample. In embodiments, the device includes one or more sensor arrays. In embodiments, each sensor array is a TDI sensor array. A sensor array refers to a device or apparatus having a plurality of elements that convert the energy of contacted photons into an electrical response. The term "time delay integration" or "TDI" refers to sequential detection of different portions of a sample by different subsets of elements of a detector array, wherein transfer of charge between the subsets of elements proceeds at a rate synchronized with and in the same direction as the apparent motion of the sample being imaged. For example, TDI can be carried out by scanning a sample such that a frame transfer device produces a continuous video image of the sample by means of a stack of linear arrays aligned with and synchronized to the apparent movement of the sample, whereby as the image moves from one line to the next, the stored charge moves along with it. Accumulation of charge can integrate during the entire time required for the row of charge to move from one end of the detector to the serial register. In embodiments, the sensor array (e.g., TDI sensor array) can be configured for binning.

In embodiments, the image sensor (e.g., a CCD array or CMOS array) can be configured for binning. Binning increases the detector array's sensitivity by summing the charges from multiple pixels in the array into one pixel. Exemplary types of binning that can be used include horizontal binning, vertical binning, or full binning. With horizontal binning, pairs of adjacent pixels in each line of a detector array are summed. With vertical binning, pairs of adjacent pixels from two lines in the array are summed. Full binning is a combination of horizontal and vertical binning in which four adjacent pixels are summed.

The system may further include a scanning element, which may be a mechanical, electro-mechanical component, software component, or combination thereof configured to scan the sample along a direction, which may correspond to a scan direction. In an embodiment, the scan direction is orthogonal to the excitation direction of the sample. In an embodiment, the scan direction is non-orthogonal to the excitation beam direction, wherein the orthogonal projected component directly contributes to the final image reconstruction. The term "scanning element" is intended to mean an element capable of sequentially detecting different portions of a sample. A scanning element can operate, by changing the position of one or more component of the system including, for example, the light source the objective lens, the image sensor, or the sample. Exemplary scanning elements include, but are not limited to a galvanometer configured to move a beam (e.g., excitation beam) across a sample or a translation stage configured to move the sample across the beam.

Figure 12A:
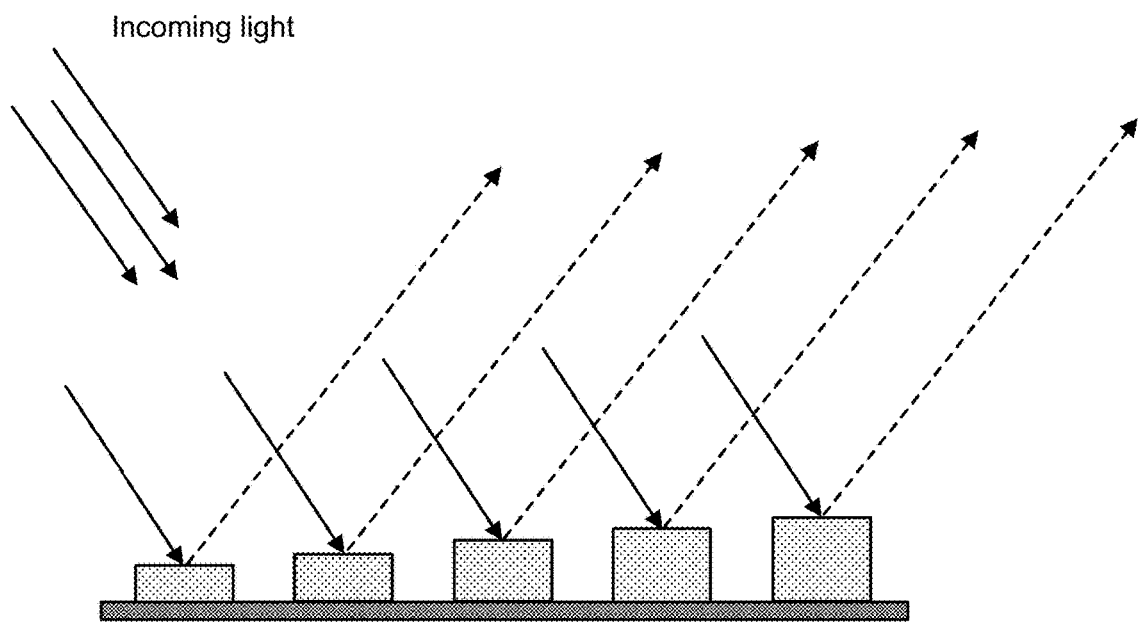
FIGS. 12A-12D shows embodiments for generating multiple depth illuminations. For example, reflector arrays having a flat reflective surface (FIG. 12A) or an apex (FIG. 12B) may be used for generating illumination patterns at alternating depths.
Figure 12B:
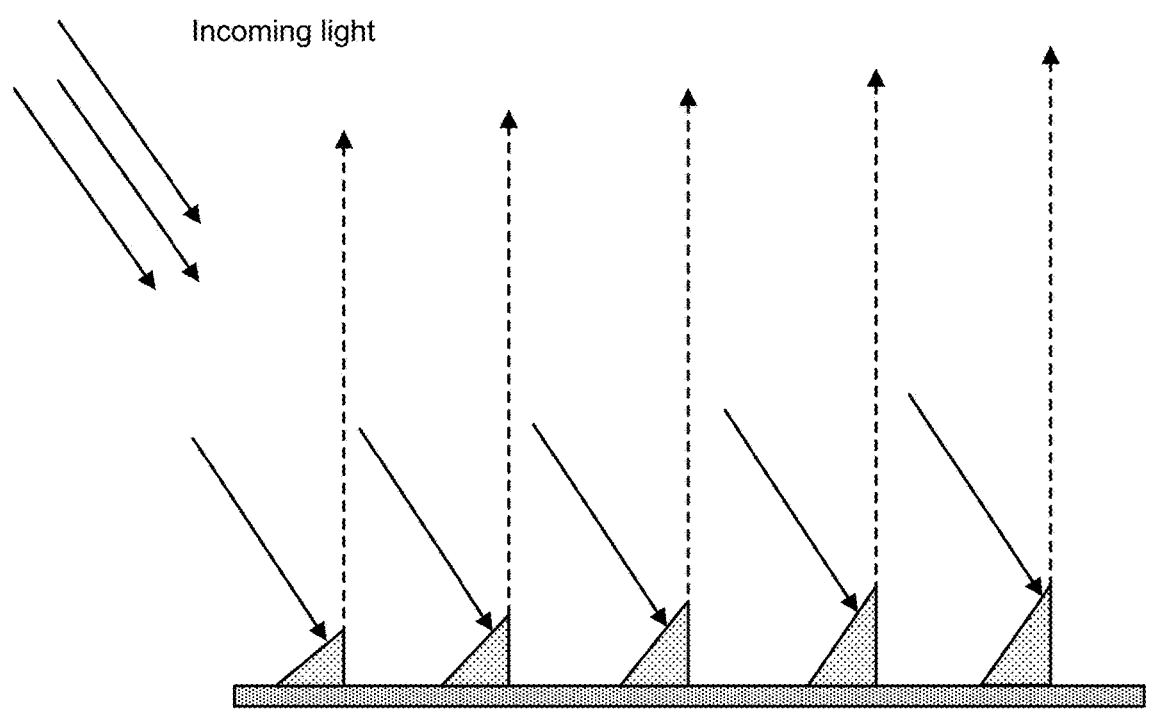
Figure 12C:
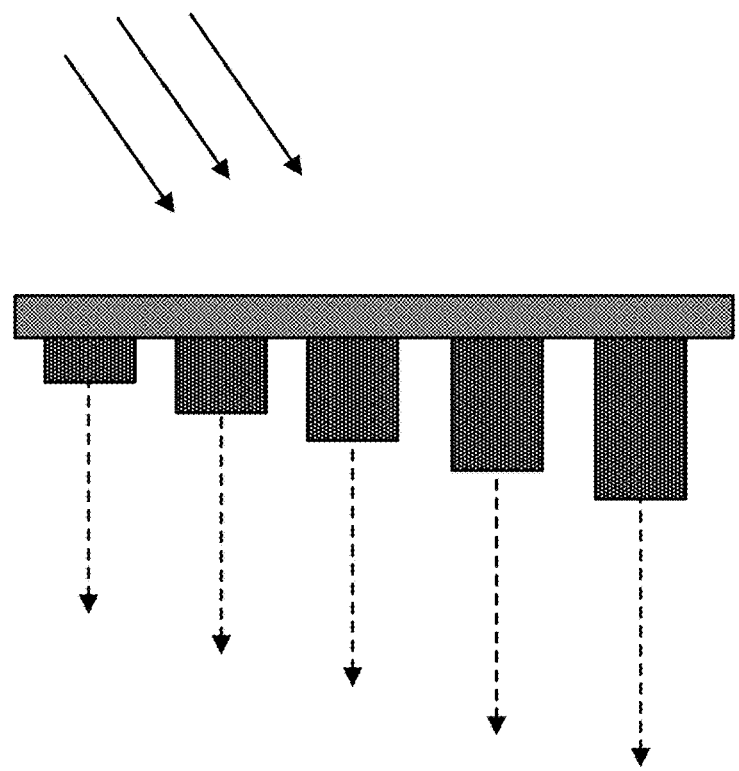
Figure 12D:
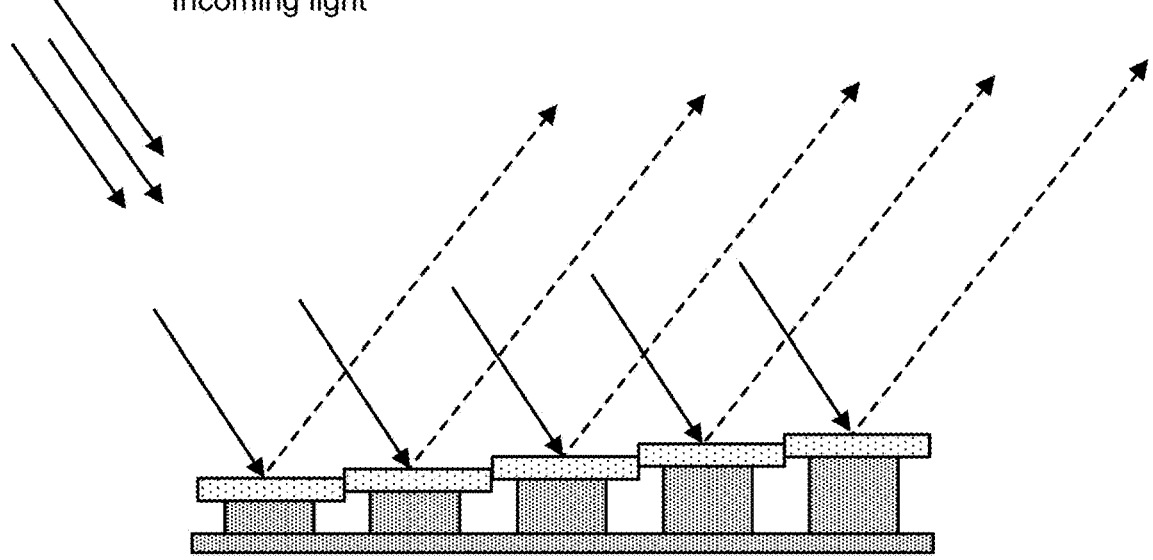

The system is configured to effectuate multi-depth confocal imaging. In this regard, the system achieves multi-depth imaging without requiring the use of a high-NA immersion type of objective lens for oblique-plane light-sheet microscopy. In an embodiment described further below, the system includes a set of fiber optics that at least partially serve as the illuminator or light source 102, wherein the fiber optics are assembled in a three-dimensional bundle pattern configured to introduce multi-depth excitation patterns within the sample 105. The fiber optic bundle may be incorporated or otherwise coupled to a diffractive optic or micro-lens array to modify a field of view, such as to increase the size of a field of view. Alternatively, in embodiments, the system includes an illumination configuration described in FIGS. 12A-12D. For example, FIG. 12A shows an illumination configuration where light is coupled to reflector arrays formed of structures having flat reflective surfaces (such as horizontal surfaces relative to FIG. 12A). FIG. 12B shows an illumination configuration where light is coupled to reflector arrays formed of oblique structures having reflective surfaces that each form an apex. FIG. 12C shows a staggered pinhole or slit array providing illumination patterns at alternating depths. FIG. 12D shows an illumination configuration that utilizes a segmented mirror approach, wherein a reflective surface is attached to at least one moveable structure, such as movable post (e.g., actuators). The post supports a reflective surface at a height that can be varied to achieve a desired illumination depths. In embodiments, piezoelectric actuators can be electro-mechanically coupled to and used to move the posts and reflective surfaces to generate an appropriate illumination configuration.

As shown in FIG. 2, the light source 102 generates multiple lines of excitation beams 205 (such as for example laser or LED illumination beams), which are directed into a sample along an excitation direction 210. The excitation beams 205 are focused into the sample 105 through the objective lens 110 (FIG. 1), which may be interposed between a dichromatic mirror and the sample 105 such that the focused excitation beams pass therethrough. The system is configured to focus the excitation beams 205 at a variety of different focus depths (such as relative to a Z axis) in the sample 105. In embodiments, the focus depths are 1 μm to 20 μm. The objective lens 110 collects the resulting, emissions (e.g., the excited emissions) from the sample 105 and focuses the emissions onto the image sensor 115. In embodiments, the objective lens is a microscope objective lens. Exemplary telecentric objective lenses useful in the invention include those that are described in U.S. Pat. No. 5,847,400, which is incorporated herein by reference. In embodiments, the objective lens is an air objective lens. In embodiments, the objective lens is an immersion objective lens. In embodiments, the objective lens has a large numerical aperture (NA) (e.g., NA in a range between 0.95 and 1.5) and performs imaging via air immersion or liquid immersion (e.g., such as water, oil, or other immersion fluids).

Depending on the intended application (i.e., the object desired to be imaged), the focus length and magnification can be modified to suit the desired target. Since the objective magnification is the ratio of the tube lens focal length to the objective focal length, increasing or decreasing the tube lens focal length changes the objective magnification. For example, keeping the tube lens focal length constant at 160 mm, changing the objective focal length from 1.6 mm to 50 mm results in an object magnification equivalent to 100× to 3.2× magnification, respectively. In embodiments, the objective lens may have a focal length in the range from 2 mm to 25 mm. In embodiments, the objective lens may have a focal length of 1 mm to 50 mm. In embodiments, the objective lens may have a focal length of 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 mm. In embodiments, the objective lens may have a focal length of 0.8, 0.9, 1.0, 1.1, 1.2, 1.3, 1.4, 1.5, or 1.6 mm In embodiments, the objective lens may have a focal length of 1.6 mm.

Figure 11:
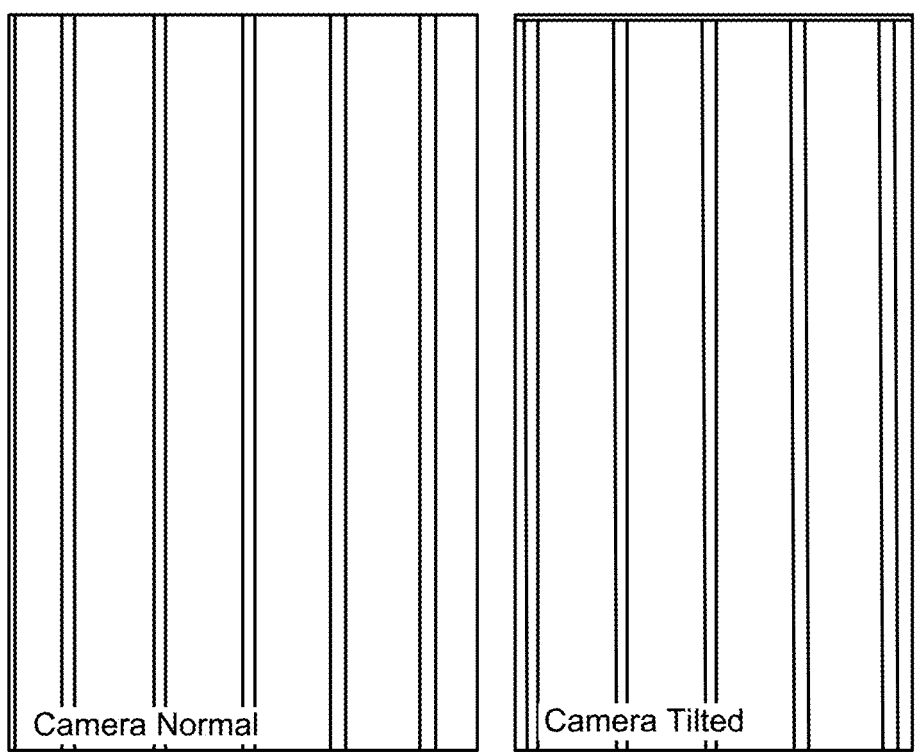
FIG. 11 shows an image acquired according to the methods and devices described herein. The image on the left provides a series of 5 lines projected into the sample at different depths at 1.5 µm intervals. When the image sensor is normal (i.e., non-oblique) relative to the sample, a subset of the line sets are in focus. When image sensor (e.g., camera) is tilted (i.e., oblique to the sample) all of the line sets at differing depths are simultaneously in focus.

Because the excitation foci are at different depths of the sample, their resulting and corresponding foci are at different heights or positions on the image sensor corresponding to the focus depths in the sample. This is illustrated in the image presented on the left in FIG. 11. In embodiments, the focus depths are at 0.0 (i.e., on the surface of the sample), −0.5, −1.0, −1.5, and −2.0 µm, wherein the negative sign indicates the length from the surface. In embodiments, the focus depths are separated at interval depths. In embodiments, the interval depths (e.g., delta z) are 0.1, 0.25, 0.5, 0.75, 1.0, 1.25, 1.5, 1.75, or 2.0 µm relative to the surface. For example, when the imaging system has an interval depth of 1.0 µm, for five bundles (e.g., 330$a$, 330$b$, 330$c$, 330$d$, and 330$e$), the total depth imaged is 5.0 µm relative to the surface of the sample.

A sample refers to an object or location that is intended to be detected. In embodiments, a sample includes a plurality of distinct features that are targets for imaging. In some embodiments a sample includes a non-planar structure with a surface, such as a bead or a well, to which target nucleic acids have been attached as the target features. In embodiments, the sample is held by a sample holder. The sample holder can be a multiwell plate. In some instances, the multiwell plate has 16, 24, 48, 96, 384 or more sample wells. In some of these instances, an array of light sources, e.g., LEDs, has 16, 24, 48, 96, 384 or more corresponding light sources. In some instances, the multiwell plate is a standard microwell plate for biological analysis. In embodiments, the sample holder is coated, at least internally, with a material for preventing a biological materials from sticking to the sample holder, such as a fluorinated polymer or BSA. In embodiments, the sample includes genomic material which may be sequenced. In embodiments, the sample includes labeled nucleotides, for example nucleotides containing different labels corresponding to different wavelengths of light. The labels may be, for example, fluorescent, chemiluminescent or bioluminescent labels. For example, in gene sequencing (or DNA sequencing), embodiments may be used to determine the precise order of nucleotide bases within a nucleic acid polynucleotide (e.g., a strand of DNA). The nucleotide bases may be labeled with a specific fluorescent label (e.g., adenine (A), guanine (G), cytosine (C), or thymine (T)). Alternatively, one color, two color, or three color sequencing methods, for example, may be used. With respect to fluorescence, each of the nucleotide bases may be determined in order by successively exciting the nucleic acid with excitation light. The nucleic acid may absorb the excitation light and transmit an emitted light of a different wavelength onto an image sensor as described herein. The image sensor may measure the wavelength of emitted light and intensity received by the photodiode. Each nucleotide (e.g., fluorescently labeled nucleotide), when excited by excitation light of a certain wavelength and/or intensity, may emit a certain wavelength of light and/or intensity into the image sensor, allowing identification of the presence of a particular nucleotide base at a particular position in the nucleic acid. Once that particular nucleotide base has been determined, it may be removed from the nucleic acid, such that the next successive nucleotide base may be determined according to a similar process.

In embodiments, the sample includes a substrate. In embodiments, the sample includes a flowcell. In embodiments, the flowcell includes a translucent cover plate, a substrate, and a liquid sandwiched therebetween, and a biological sample may be located at an inside surface of the translucent cover plate or an inside surface of the substrate. For example, the cover glass may be between about 100 µm and about 500 µm thick, the liquid layer may be between about 50 µm and about 150 µm thick, and the substrate may be between about 0.5 µm and about 1.5 µm thick. In embodiments, the sample includes a gel. The term "gel" in this context refers to a semi-rigid solid that is permeable to liquids and gases. Exemplary gels include, but are not limited to, those having a colloidal structure, such as agarose; polymer mesh structure, such as gelatin; or crosslinked polymer structure, such as polyacrylamide or a derivative thereof. Analytes, such as polynucleotides, can be attached to a gel or polymer material via covalent or non-covalent means. Exemplary methods and reactants for attaching nucleic acids to gels are described, for example, in US 2011/0059865 which is incorporated herein by reference. The analytes, sample, tissue, or cell can include nucleic acids and the nucleic acids can be attached to the gel or polymer via their 3' oxygen, 5' oxygen, or at other locations along their length such as via a base moiety of the 3' terminal nucleotide, a base moiety of the 5' nucleotide, and/or one or more base moieties elsewhere in the molecule. In embodiments, the sample includes a polymer layer (alternatively referred to as a polymer coating).

For example, the biological sample may include DNA, RNA, or another genomic material which may be sequenced. As used herein, the terms "solid support" and "substrate" and "substrate surface" and "solid surface" refers to discrete solid or semi-solid surfaces to which a plurality of functional groups may be attached. A solid support may encompass any type of solid, porous, or hollow sphere, ball, cylinder, or other similar configuration composed of plastic, ceramic, metal, or polymeric material (e.g., hydrogel) onto which a biological material, such as a nucleic acid, may be immobilized (e.g., covalently or non-covalently). A solid support may comprise a discrete particle that may be spherical (e.g., microspheres) or have a non-spherical or irregular shape, such as cubic, cuboid, pyramidal, cylindrical, conical, oblong, or disc-shaped, and the like. A bead can be non-spherical in shape. A solid support may be used interchangeably with the term "bead." A solid support may further comprise a polymer or hydrogel on the surface to which the primers are attached. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefin copolymers, polyimides etc.), nylon, ceramics, resins, Zeonor, silica or silica-based materials including silicon and modified silicon, carbon, metals, inorganic glasses, optical fiber bundles, photopatternable dry film resists, UV-cured adhesives and polymers. The solid support, or regions thereof, can be substantially flat. The solid support can have surface features such as wells, pits, channels, ridges, raised regions, pegs, posts or the like. The term solid support is encompassing of a substrate having a surface comprising a plurality of functional groups covalently attached thereto, wherein the functional groups are selected to immobilize the sample. In embodiments, the sample includes a substrate, wherein the substrate can include any inert substrate or matrix to which nucleic acids can be attached, such as for example glass surfaces, plastic surfaces, latex, dextran, polystyrene surfaces, polypropylene surfaces, polyacrylate copolymers, polyacrylamide copolymers, gold surfaces, and silicon wafers.

In embodiments, the sample is an array (e.g., a microarray). A typical microarray contains sites, sometimes referred to as features, each having a population of targets. Sites or features of an array are typically discrete, being separated with spaces between each other. The size of the features and the spacing between the features can vary such that arrays can be high density, medium density or lower density. High density arrays are characterized as having sites separated by less than about 15 μm. Medium density arrays have sites separated by about 15 to 30 μm, while low density arrays have sites separated by greater than 30 μm. In embodiments, the sample is an array including features that are separated by less than 100 μm, 50 μm, 10 μm, 5 μm, 1 μm or 0.5 μm. Other exemplary samples include, but are not limited to, biological specimens (e.g., a nucleic acid, a protein, a cell, a virus, or a tissue), nanoparticles, or electronic chips (e.g., a microprocessor chip). In embodiments, the sample includes a microplate array, including: a substrate including a surface, the surface comprising a plurality of wells separated from each other by interstitial regions on the surface, wherein one or more wells includes a sample (e.g., a cell or tissue sample), particle, or nucleic acid. In embodiments, the sample includes a cell. In embodiments, the sample includes a particle. In embodiments, the sample includes a nucleic acid. In embodiments, the sample is a tissue sample. In embodiments, the sample includes a cell. In embodiments, the surface is substantially free of oligonucleotides. In embodiments, the microplate array includes 2, 4, 6, 12, 24, 48, 96, 384 or 1536 wells. In embodiments, the microplate array includes 24, 48, 96, or 384 wells. In embodiments, the microplate array includes 24 wells. In embodiments, the microplate array includes 48 wells. In embodiments, the microplate array includes 96 wells. In embodiments, the microplate array includes 384 wells. In embodiments, the dimensions of the microplate conform to the standards provided by the American National Standards Institute (ANSI) and Society For Laboratory Automation And Screening (SLAS); for example the tolerances and dimensions set forth in ANSI SLAS 1-2004 (R2012); ANSI SLAS 2-2004 (R2012); ANSI SLAS 3-2004 (R2012); ANSI SLAS 4-2004 (R2012); and ANSI SLAS 6-2012. In embodiments, the microplate has a rectangular shape that measures 127.7 mm±0.5 mm in length by 85.4 mm±0.5 mm in width, and includes 6, 12, 24, 48, or 96 wells. In embodiments, the microplate has a rectangular shape that measures 127.7 mm±0.5 mm in length by 85.4 mm±0.5 mm in width, and includes 6, 12, 24, 48, or 96 wells, wherein each well has an average diameter of about 5-7 mm. In embodiments, the microplate has a rectangular shape that measures 127.7 mm±0.5 mm in length by 85.4 mm±0.5 mm in width, and includes 6, 12, 24, 48, or 96 wells, wherein each well has an average diameter of about 6 mm.

In embodiments, the sample includes a label. A label moiety can be any moiety that allows the sample to be detected, for example, using a spectroscopic method. Exemplary label moieties are fluorescent labels, mass labels, chemiluminescent labels, electrochemical labels, detectable labels and the like. As used herein, the term "label" or "labels" generally refer to molecules that can directly or indirectly produce or result in a detectable signal either by themselves or upon interaction with another molecule. Non-limiting examples of detectable labels include labels comprising fluorescent dyes, biotin, digoxin, haptens, and epitopes. In general, a dye is a molecule, compound, or substance that can provide an optically detectable signal, such as a colorimetric, luminescent, bioluminescent, chemiluminescent, phosphorescent, or fluorescent signal. In embodiments, the dye is a fluorescent dye. Non-limiting examples of dyes, some of which are commercially available, include CF dyes (Biotium, Inc.), Alexa Fluor dyes (Thermo Fisher), DyLight dyes (Thermo Fisher), Cy dyes (GE Healthscience), IRDyes (Li-Cor Biosciences, Inc.), and HiLyte dyes (Anaspec, Inc.). In embodiments, the label is a fluorophore. Examples of detectable agents (i.e., labels) include imaging agents, including fluorescent and luminescent substances, molecules, or compositions, including, but not limited to, a variety of organic or inorganic small molecules commonly referred to as "dyes," "labels," or "indicators." Examples include fluorescein, rhodamine, acridine dyes, Alexa dyes, and cyanine dyes. In embodiments, the detectable moiety is a fluorescent molecule (e.g., acridine dye, cyanine, dye, fluorine dye, oxazine dye, phenanthridine dye, or rhodamine dye). In embodiments, the detectable moiety is a fluorescent molecule (e.g., acridine dye, cyanine, dye, fluorine dye, oxazine dye, phenanthridine dye, or rhodamine dye).

In embodiments, the sample does not include a label. In embodiments, the methods and system as described herein detect scattered light from the sample. In embodiments, the methods and system as described herein detect diffracted light from the sample. In embodiments, the methods and system as described herein detect reflected light from the sample. In embodiments, the methods and system as described herein detect absorbed light from the sample. In embodiments, the methods and system as described herein detect refracted light from the sample. In embodiments, the methods and system as described herein detect transmitted light not absorbed by the sample. In embodiments, the device is configured to determine the cell morphology (e.g., the cell boundary, granularity, or cell shape). For example, to determining the cell boundary includes comparing the pixel values of an image to a single intensity threshold, which may be determined quickly using histogram-based approaches as described in Carpenter, A. et al Genome Biology 7, R100 (2006) and Arce, S., Sci Rep 3, 2266 (2013)).

In embodiments, at least a portion of the image sensor 115 is positioned at a tilted or oblique orientation relative to the optical axis of the objective lens 110 to compensate for the differences in height of the excitation foci on the image sensor. That is, the image sensor is positioned, placed, or oriented obliquely relative to the optical axis of the objective lens 110. In embodiments, the oblique angle (i.e., the angle between the sensor 115 relative to the optical axis of the objective lens 110) is between 0° and 90°. In embodiments, the oblique angle is between 10° and 80°. In embodiments, the oblique angle is between 15° and 65°. In embodiments, the oblique angle is between 25° and 45°. In embodiments, the oblique angle is between 5° and 20°. In embodiments, the oblique angle is between 5° and 15°. In embodiments, the oblique angle is about 5°, 6°, 7°, 8°, 9°, 10, 11°, 12°, 13°, 14°, 15°, 16°, 17°, 18°, 19°, or about 20°. The orientation of the image sensor, or an aspect thereof, is selected to correspond to different Z axis focus depths of the excitation beams. The tilt angle of the image sensor (i.e., the camera) is dependent on the focal length of the collimation lens and/or the tub lens. In embodiments, the tilt angle of the image sensor (i.e., the camera) is dependent on the focal length of the collimation lens and the tub lens.

The image sensor may be or include a complementary metal-oxide-semiconductor (CMOS) array, a charge-coupled device (CCD) array, an array of photodiodes, an array of avalanche photodiodes, an array of photomultiplier tubes (PMTs), or an array of optical fibers. In embodiments, the image sensor is at least one of a complementary metal-oxide-semiconductor (CMOS) array and a charge-coupled device (CCD) array. In an embodiment, the image sensor is a camera. In an embodiment, the image sensor is a plurality of cameras. In an embodiment, the image sensor is four cameras. In an embodiment, the image sensor is two cameras. In an embodiment, the image sensor is a single camera. In embodiments, the image sensor is an array of optical fibers. In embodiments, the image sensor is a light-field camera (i.e., a plenoptic camera), for example a light-field camera described in US 2015/0029386 (U.S. application Ser. No. 14/456,132) which is incorporated herein by reference. In embodiments, the image system includes an image sensor. In embodiments, the image sensor is a CMOS array. A CMOS array, alternatively referred to as a CMOS camera, typically use an active-pixel sensor (APS) that is an image sensor comprising of an integrated circuit containing an array of pixels, where each pixel includes a photodetector and an active amplifier. In embodiments, the image sensor includes a PIN photodiode, a CCD array, a CMOS array, a line scanner, a photodiode, a phototransistor, a photomultiplier, or an avalanche photodiode. In embodiments, the image sensor is a CCD array. In embodiments, the image sensor includes a confocal time delay and integration (TDI) line scan imaging system that has high S/N ratio and high confocality for producing high resolution images of a sample. The image sensor may be or include a complementary metal-oxide-semiconductor (CMOS) array, a charge-coupled device (CCD) array, an array of photodiodes, an array of avalanche photodiodes, an array of photomultiplier tubes (PMTs), or an array of optical fibers. In embodiments, the image sensor is at least one of a complementary metal-oxide-semiconductor (CMOS) array and a charge-coupled device (CCD) array. In an embodiment, the image sensor is a camera. In an embodiment, the image sensor is a plurality of cameras. In an embodiment, the image sensor is four cameras. In an embodiment, the image sensor is two cameras. In an embodiment, the image sensor is a single camera. In embodiments, the image sensor is an array of optical fibers.

To reject the out-of-focus background, the image sensor is set, positioned, or oriented such that only a portion of the pixels that correspond to the diffraction limited spot size of the foci on the image sensor is sensitive to the photons and achieves confocal detection. In so doing, the system concurrently images multiple emissions (e.g., lines) at various depths.

Figure 3:
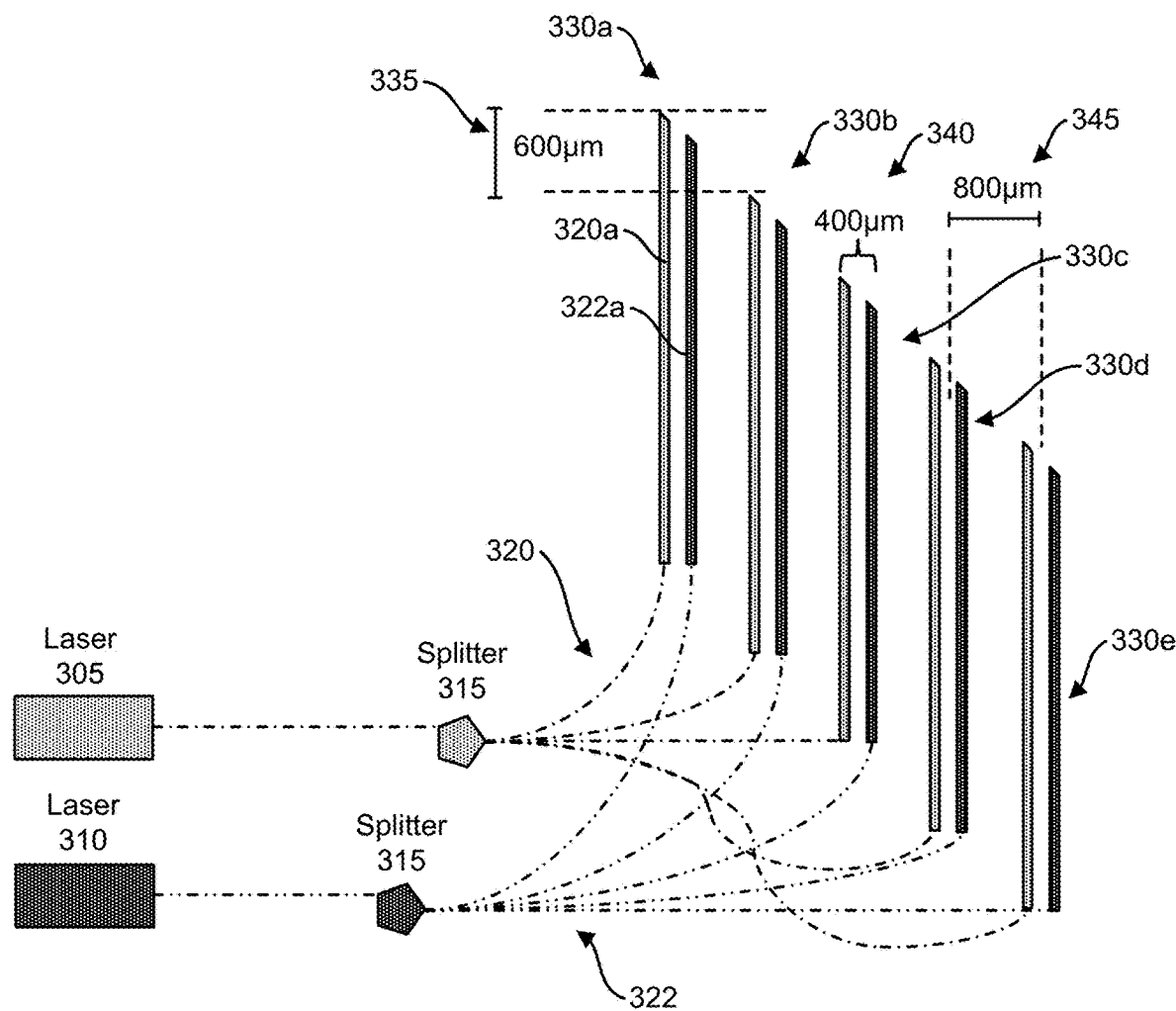
FIG. 3 shows an aspect of the imaging system wherein multiple depth illuminations traverse through a 3D patterned fiber-optics illuminator.

In an embodiment, the system scans the sample 105 in or along a single direction (i.e., a single axis, inclusive of forward and reverse motion along that axis), such as a scan direction orthogonal to the excitation direction 210 to generate a 3D volumetric image of the sample 105. The scanning of the sample 105 can be synchronized to the image sensor. As the system scans through the sample 105 across the multi-depth foci, the image sensor concurrently records or generates multiple images of the sample at the different depths to thereby generate the 3D volumetric image of the sample 105. The system can be configured to utilize an Airy beam coupled to an array detector to achieve super resolution of an image beyond a diffraction limit in a common or same direction as the scan direction. The term "coupled" refers to direct or indirect joining, connecting, fastening, contacting or linking, and may refer to various forms of coupling such as physical, optical, electrical, fluidic, mechanical, chemical, magnetic, electromagnetic, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components As mentioned, an embodiment of the system includes fiber optics assembled in a three-dimensional bundle pattern configured to introduce multi-depth excitation patterns within the sample 105. FIG. 3 illustrates a schematic representation of a system that employs a 3D patterned fiber-optics illuminator that generates multiple depth illuminations relative to the sample. In the example embodiment of FIG. 3, the system includes one or more lasers (including laser 305 and laser 310) with different excitation wavelengths. The system can also include corresponding laser generators. FIG. 3 shows two lasers 305, 310 although the quantity can vary. In a non-limiting example, one laser has an excitation wavelength of 532 nm and another laser has an excitation wavelength of 640 nm although the excitation wavelength can vary. The system further includes a respective splitter 315 (e.g., a beam splitter) for each laser, which splits the light of the laser into multiple optic fibers 320 and 322 corresponding to each laser 305 and 310, respectively. FIG. 3 shows an embodiment wherein each splitter 315 is a 1-to-5 splitter although the splitters can be configured to split into various quantities of fiber optics. As used herein, the term "beam splitter" is used in accordance with its ordinary meaning in the art and refers to an optical element that passes a first portion of an excitation beam and reflects a second portion of the beam. For example, a beam splitter can be configured to selectively pass a beam in a first wavelength range and reflect a beam in a second, different, wavelength range. When used for fluorescence detection the beam splitter will typically reflect the shorter wavelength excitation beam and transmit the longer wavelength emission beam.

With reference still to FIG. 3, the fibers 320 are arranged in a 1D pattern with focus ends of the fibers 320 offset in the Z axis relative to the sample (i.e., labeled as delta z depths in FIG. 11), which is positioned relative to the focus ends. The fibers corresponding to each laser are separated and grouped into separate bundles 330, wherein each bundle includes at least one fiber from a respective laser. For each bundle 330, the fibers within that bundle have a common focus end along the Z axis. The illustrated embodiment includes five bundles (i.e., five sets) 330a, 330b, 330c, 330d, and 330e wherein each bundle 330 includes at least one fiber 320 from the laser 305 and at least one fiber 322 from the laser 310. For example, bundle 330a includes fiber 320a from laser 305 and further includes fiber 322a from laser 310. The focus ends of the fibers 320a and 322a in the bundle 330a have a common Z axis location relative to the sample. In embodiments, the fiber bundles include single mode, multi-mode, or a combination thereof (i.e., a combination of single-mode and multi-mode fibers). In embodiments, the number of fibers within the bundle could be 1 to a 500. Typically, increasing the number of fibers increases the homogeneity of the illumination, and thus provides an increase in the field of view of the imaging system.

Each bundle 330 has a focus end that is offset along a Z axis from another bundle 330. Thus, each bundle 330 achieves a different focus in the sample along the Z axis relative to another bundle. For example, the focus ends of the fibers in the bundle 330a are offset from the focus ends of the fibers in the bundle 330b by a Z axis offset distance 335. In a non-limiting example, the Z axis offset distance 335 is about 600 μm. The offset distance 335 can be the same across all the bundles 330 or it can vary from one bundle to another. That is, the Z axis offset distance is not necessarily uniform from one bundle to another but can rather vary such that a line that connects the focus end of all the bundles is not necessarily linear. Such a line that the focus end of all the bundles can also be linear or curvilinear.

The offset of the fibers in Z determines the distance between the different focal planes. The optimal offset distance typically depends on the magnification of the optical system. In a non-limiting example, if the axial resolution of the imaging system is 1.5 μm, and its axial magnification is 20, the offset of the fibers is 1.5×20×20=600 μm. Such an arrangement allows different fibers to generate foci in the sample separated by exactly the axial resolution limit of the imaging system. In embodiments, where the planes of interest are pre-determined, the offset of the fibers may be adjusted accordingly to allow the illumination overlap with those predetermined planes. As used herein, the term "magnification" is used in accordance with its ordinary meaning in the art and refers to the ratio of the size of an object to the size of an image of the object.

With reference still to FIG. 3, the fibers 320, 322 located in a common bundle 330 can be offset from one another by an offset distance 340 along an X axis normal to the z-axis. The terms "z-axis" and "z direction" are intended to be used consistently with their use in the art of microscopy and imaging systems in general, in which the z-axis refers to the focal axis. Accordingly, a z-axis translation results in increasing or decreasing the length of the focal axis. A z-axis translation can be carried out, for example, by moving a sample stage relative to an optical stage (e.g., by moving the sample stage or an optical element or both). In a nonlimiting example, the offset distance 340 is about 400 μm. Furthermore, there can be an offset distance 345 along the x-axis from a first bundle 330 relative to an adjacent second bundle 330. For example, the offset distance 345 between the bundle 330d and the bundle 330e can be around 800 μm in a nonlimiting example. The arrangement shown in FIG. 3 offsets output of the fibers of each bundle 330 in the Z axis relative to another bundle, wherein the output of the fibers is focused through an objective lens into the sample at different depths for each bundle to achieve the multiple depth imaging.

Figure 4A:
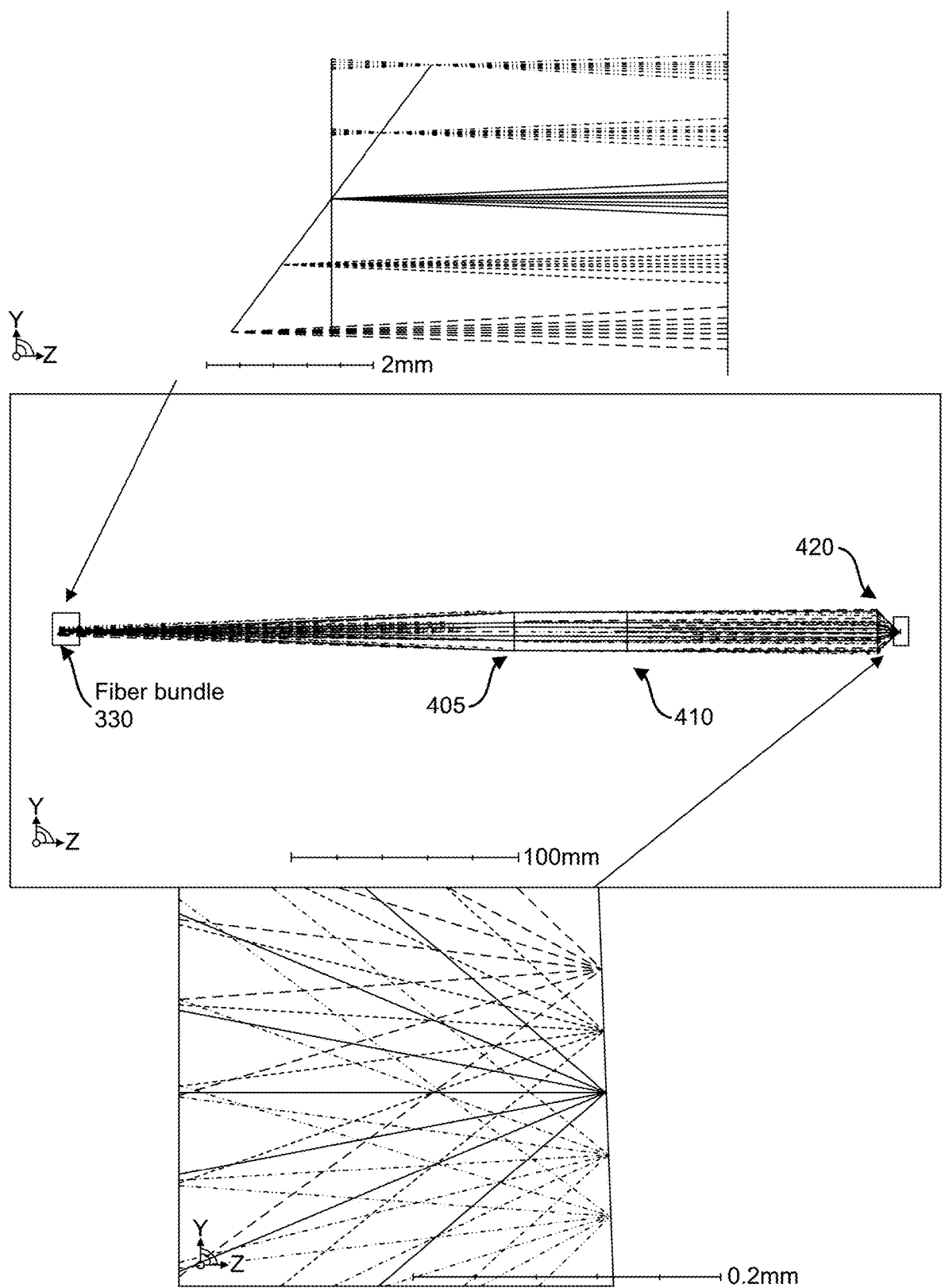
FIGS. 4A and 4B illustrates principle of the multiple-depth foci generation visualized through a computer simulation.
Figure 4B:
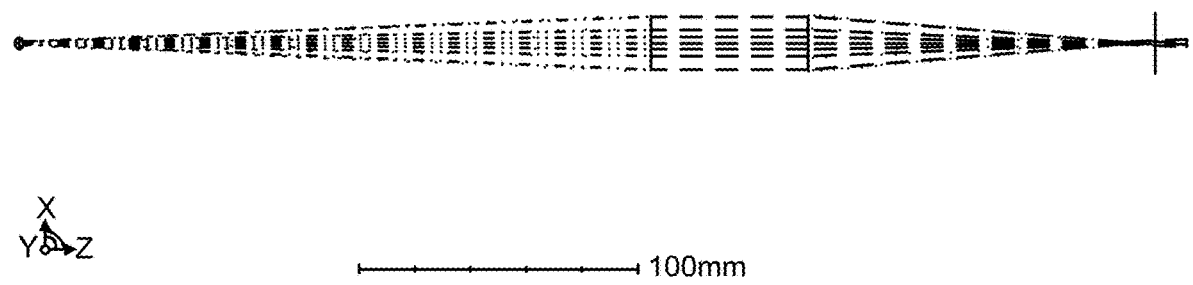

FIGS. 4A and 4B illustrates the principle of the multiple-depth foci generation visualized through a computer simulation (such as using OPTICSTUDIO software by ZEMAX). A paraxial simulation is used as a basis for illustrating the principles achieved by the systems described herein. FIG. 4A shows the Y-Z plane view of an optical lay out for an example fiber bundle 330. A fiber bundle (such as a bundle depicted in FIG. 3) is placed at the focal plane of a collimation lens 405, which converts the output of the 3D patterned fibers into nearly-collimated beams, which then pass through a cylindrical lens 410 and an objective lens 420. FIG. 4b shows a representation of the cylindrical lens focus one dimension at the back focal plane of the objective lens. As a result, multiple lines of focus are generated within the sample. The insets in FIG. 4A show that the fibers are offset in axial direction (such as the Z axis). Correspondingly, their foci are offset in the sample axially as well. FIG. 4B shows the view of the optical layout in X-Z plane. The excitation beams are spread out in the sample in X-Z plane, corresponding to the line of excitation. Specifically, a fiber bundle (330) with 5 single-model optical fibers (inset of FIG. 4A) is placed at the focal plane of a paraxial lens whose focus length is 150 mm (405). The fibers within the fiber bundles is separated apart by 800 μm laterally and 600 μm axially. The wavelength of the light is 520 nm. The paraxial lens (405) convert the light from the fiber bundles in to collimated beams. A paraxial cylindrical lens (410) whose focal lens in the XZ plane is 75 mm then focus the light into multiple lines at the focal plane of a paraxial lens (420). The focus length of the paraxial lens (420) is 10 mm. The paraxial lens (420) then generates multiple diffraction limited line-foci in the object space (inset FIG. 4A). The line foci are offset axially by 1.5 μm.

Figure 5A:
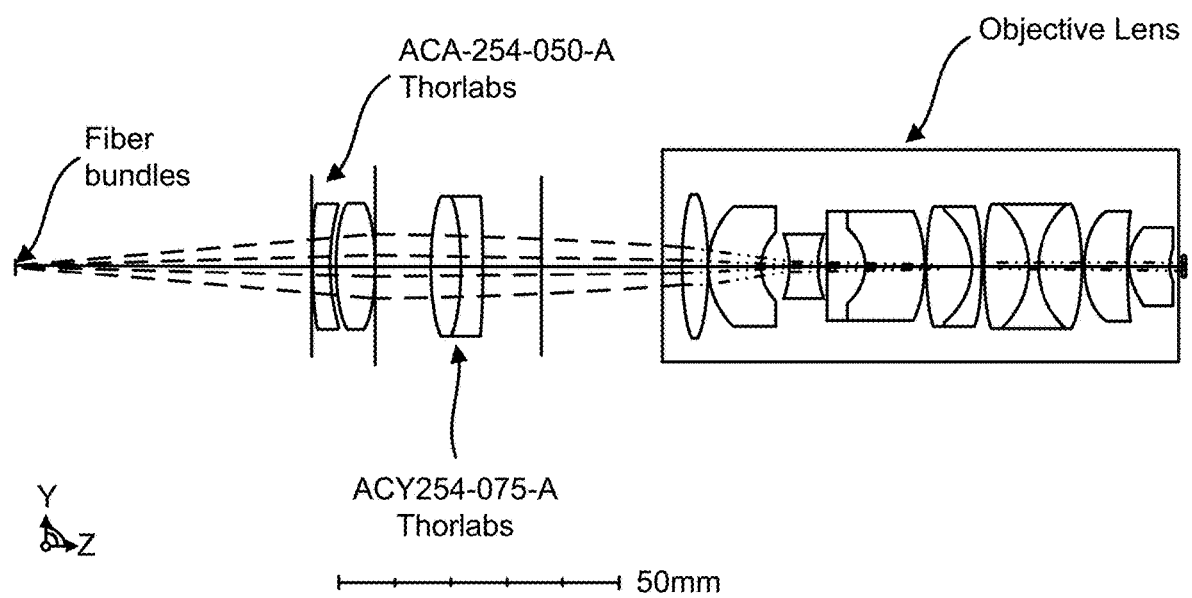
FIGS. 5A and 5B depict an optics simulation using commercially available optical elements.
Figure 5B:
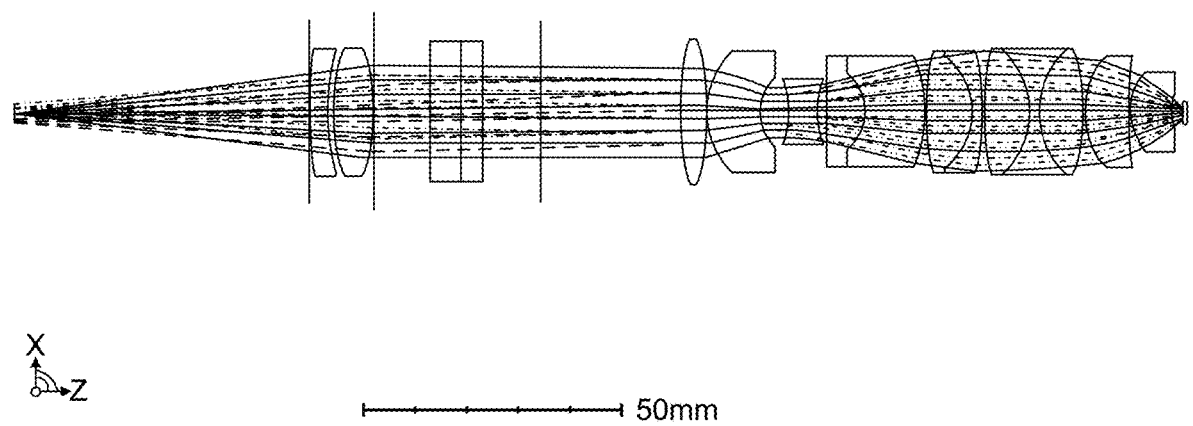

FIGS. 5A and 5B depict an example optics simulation using commercially available optical elements. A 3D patterned fiber bundle is placed at the focus of an achromat lens (e.g., f=60 mm). An achromat cylindrical lens (f=100 mm) then focuses the light at the back focal plane of an objective lens (NA=0.8). Multi-depth line-foci are generated in the sample.

Figure 6:
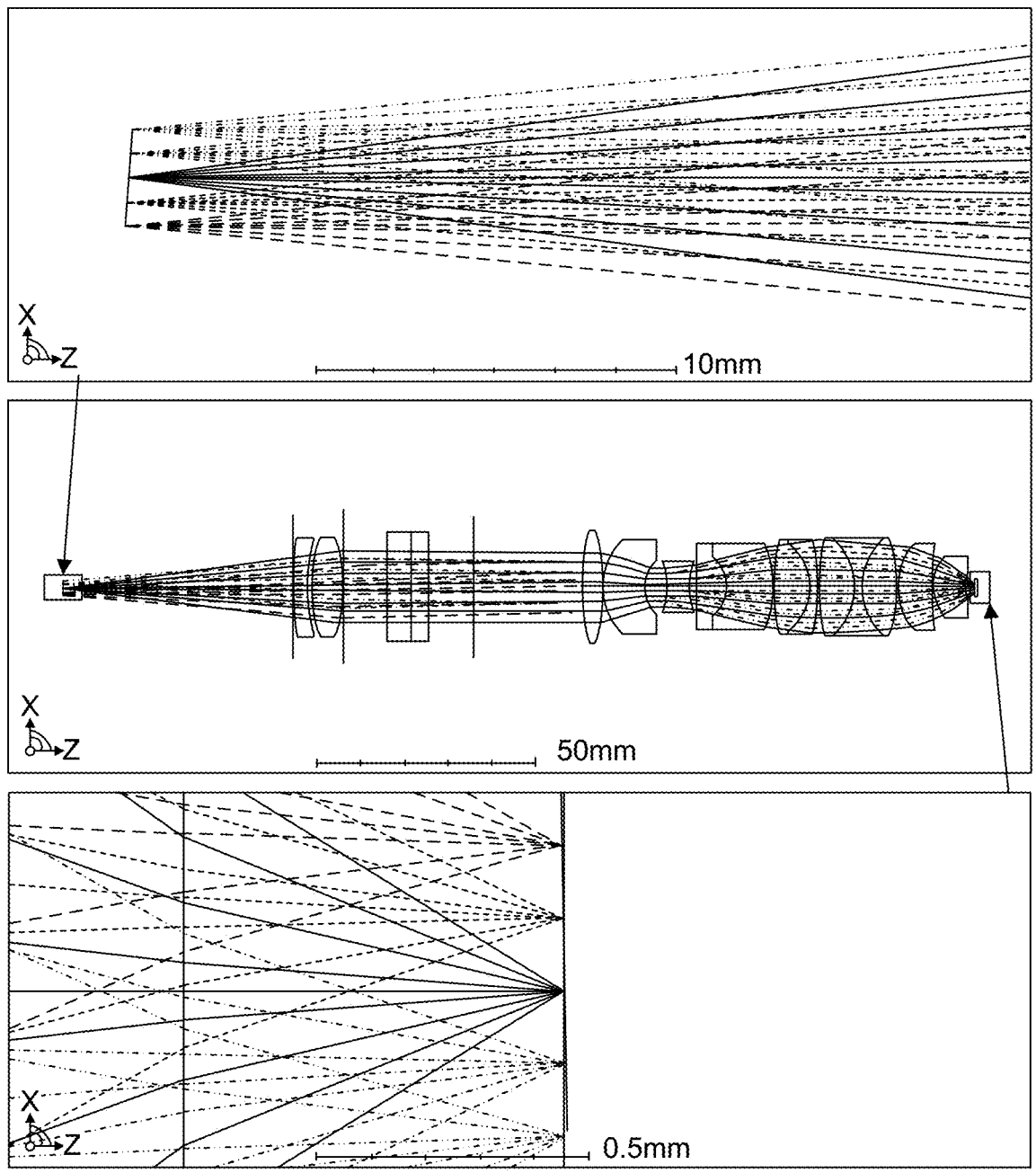
FIG. 6 shows a magnified view of a fiber bundle and a sample demonstrating the multi-depth foci.
Figure 7A:
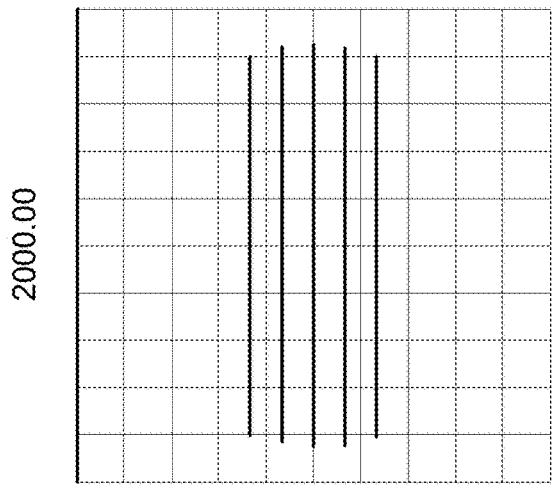
FIG. 7A-7B simulates the generated line patterns in the sample and confirm diffraction-limited foci, showing this provides confocal 3D imaging.
Figure 7B:
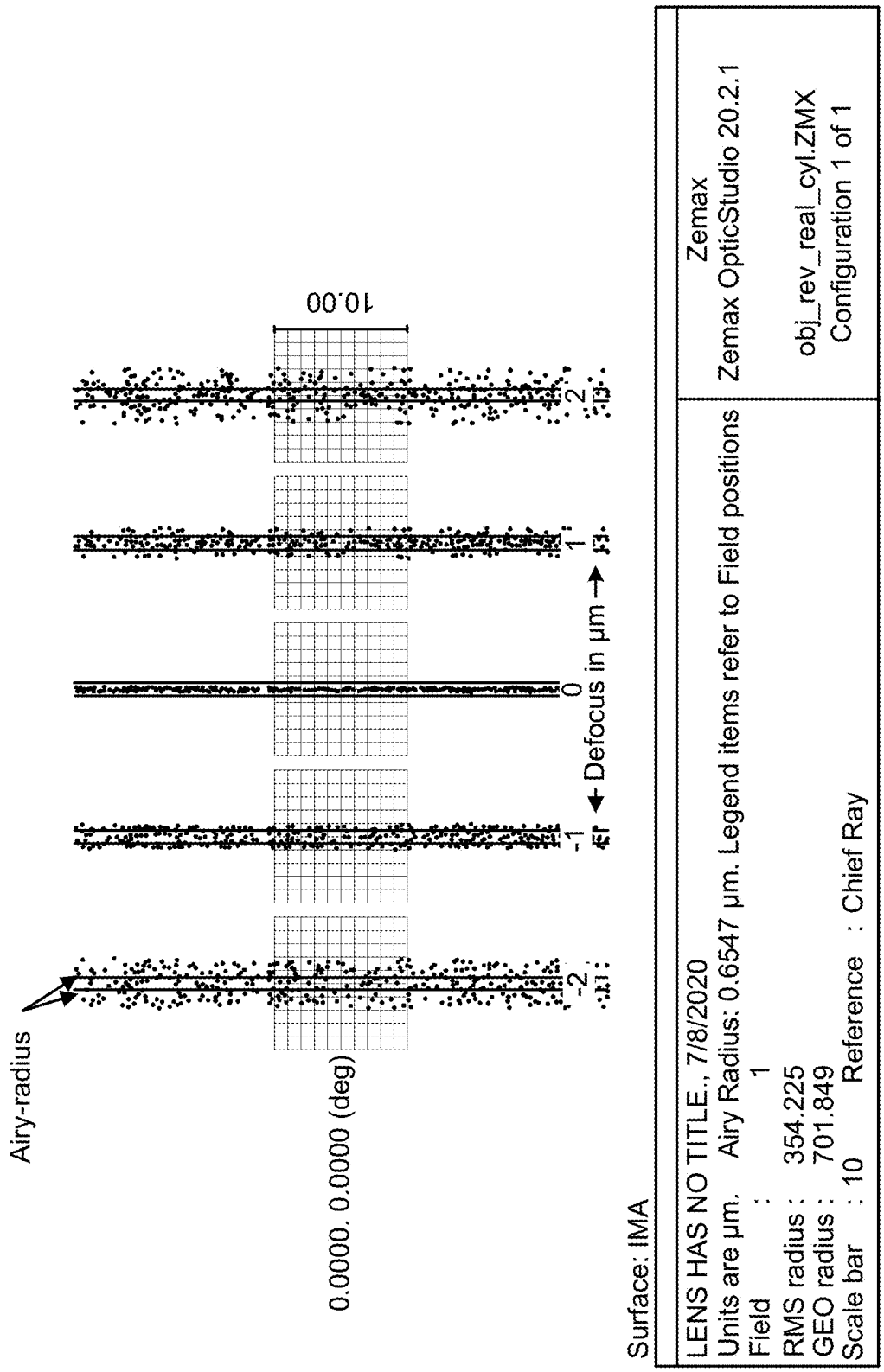

FIG. 6 shows a magnified view of the fiber bundle and the sample demonstrating the multi-depth foci. FIGS. 7A-7B show a simulation of the generated line patterns in the sample. The simulation confirms diffraction-limited foci, showing this provides confocal 3D imaging.

Figure 8:
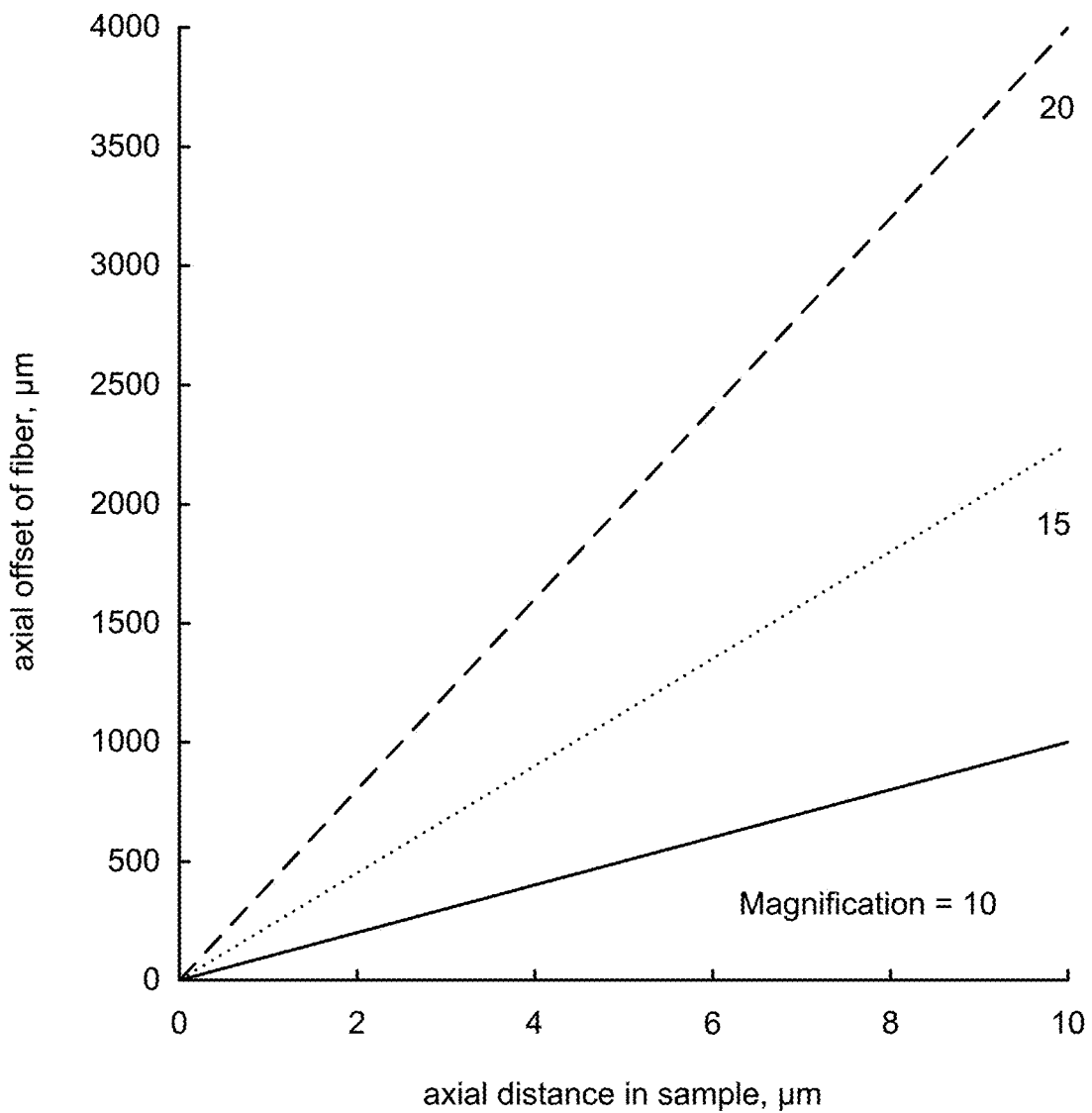
FIG. 8 illustrates the relationship between the axial position of the illumination pattern and the offset of the fibers in the fiber bundles, as further explained herein.

FIG. 8 illustrates the relationship between the axial arrangement of the fibers in the fiber bundles, and the magnification factor of the imaging system, M. The axial offset of the fiber bundle is $M^2$ of the desired axial offset of the multiple foci. FIG. 8 shows examples of three different magnification powers, 10×, 15×, and 20×. The calculated axial offset of the fibers is plotted against the desired offset of the multiple focal planes. Furthermore, it is important to note the above calculation considers that the refractive index in the sample is 1 (e.g., air). When the refractive index of the sample, n, is different than 1 (e.g., water n is 1.33, glycerol n is 1.47, immersion oil n is 1.51), the axial offset of the fibers should be multiplied by a factor of n due to the proportional relationship.

Figure 9:
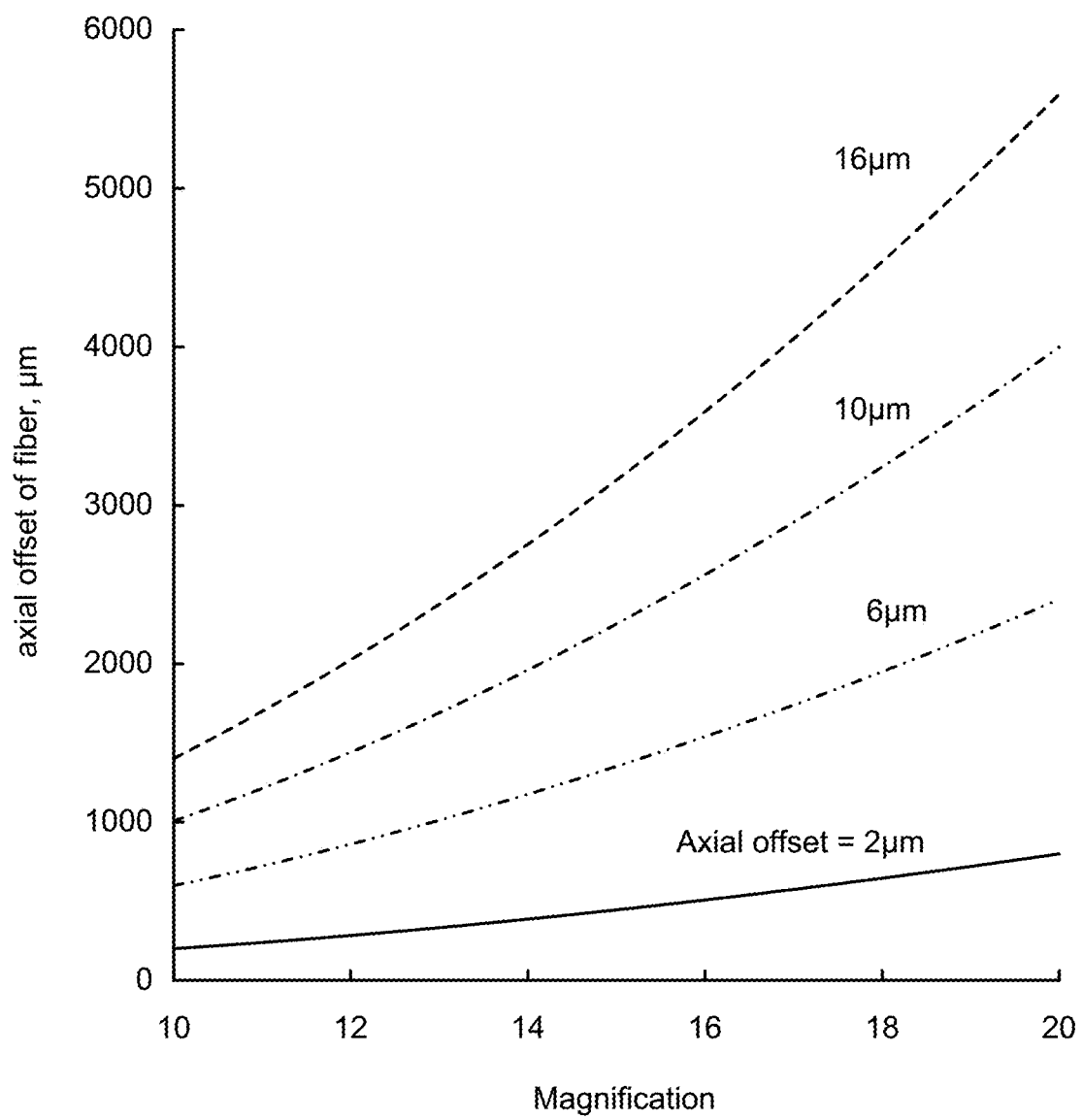
FIG. 9 illustrates how the magnification of the imaging system, including the objective lens and the colimitation lens, relates to the axial offset of the fiber bundles.
Figure 10:
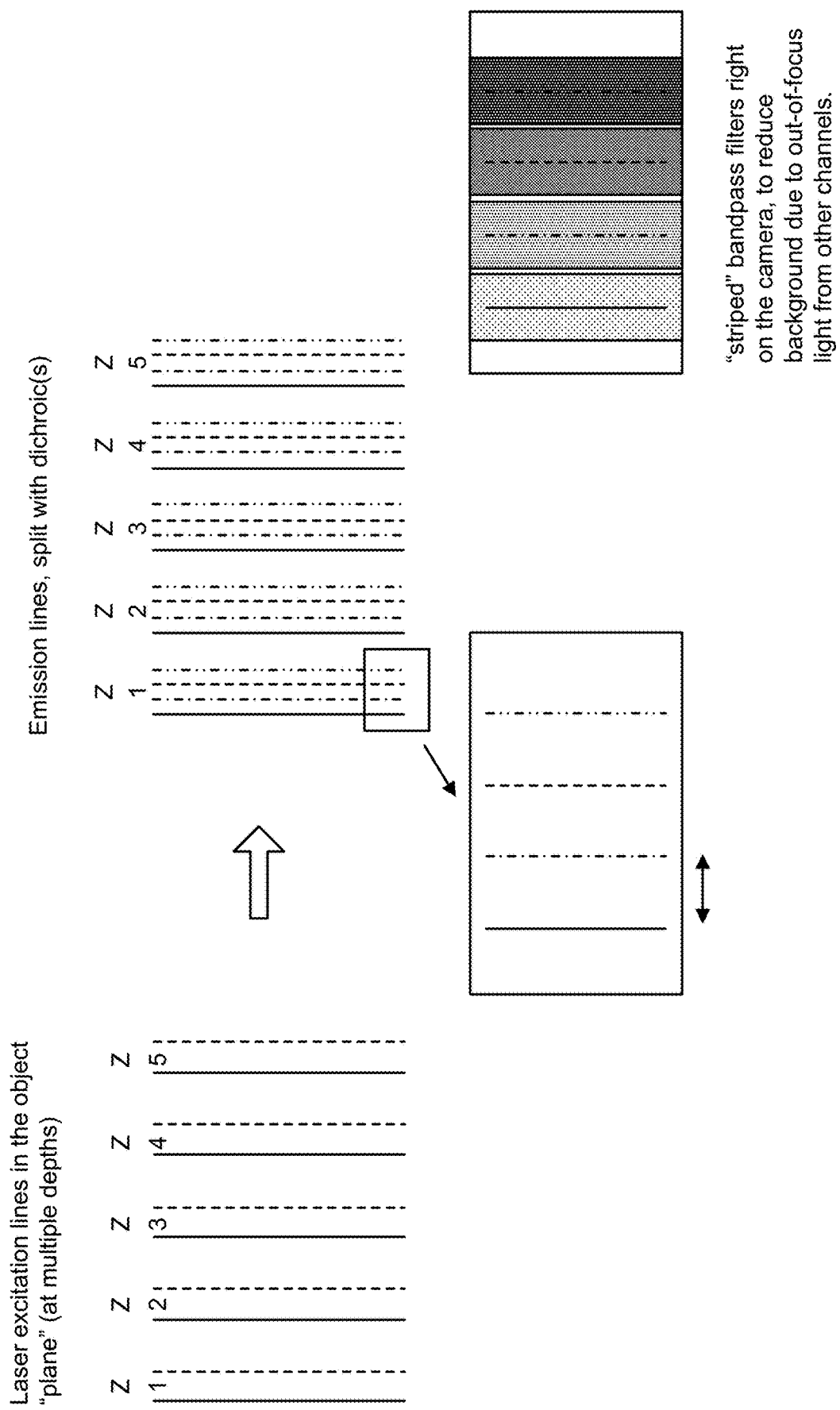
FIG. 10 illustrates a multi-color concurrent imaging design to reduce the fluorescence background from out-of-the-focus fluorescence by placing an optical filter having a striped pattern in front of the detector.

FIG. 9 further illustrates that at a series of fixed focal planes of 2 μm, 6 μm, 10 μm, and 16 μm, how the axial offset of the fibers are dependent on the square of the magnification factor, or $M^2$. The multiple depth illumination could be further extended for multiple color imaging. FIG. 10 illustrates the principle of multi-color imaging. Each laser excitation in the object plane excites a broadband of fluorescence signals from a plurality of different fluorophores. For example, a 520 nm laser could excite Alexa532, Alexa555, Alexa561, Cy3, and Atto555. A 640 nm laser could excite Cy5, Cy5.5, Alexa640, Alexa750, Atto640, and Atto640n. The fluorescence from different fluorophores could be further separated by dichromatic optical elements and projected into spatially separated lines on the camera. To further suppress the background from out-of-the-focus fluorescence signal, an optical filter with multiple stripe patterns may be placed in front of the camera to pass only the selected fluorescence lines and reject the unwanted ones. An optical filter is used in accordance with its plain ordinary meaning in the art and refers to a device for selectively passing or rejecting the passage of light having a particular wavelength, polarization or frequency. The term can include an interference filter in which multiple layers of dielectric materials pass or reflect light according to constructive or destructive interference between reflections from the various layers. Interference filters are also referred to in the art as dichroic filters, or dielectric filters. The term can include an absorptive filter which prevents the passage of light having a selective wavelength or wavelength range by absorption. Absorptive filters include, for example, colored glass or liquid. A filter can have one or more particular filter transmission characteristics including, for example, bandpass, short pass and long pass. A band pass filter selectively passes light in a wavelength range defined by a center wavelength of maximum radiation transmission ($T_{max}$) and a bandwidth and blocks passage of light outside of this range. $T_{max}$ defines the percentage of radiation transmitted at the center wavelength. The bandwidth is typically described as the full width at half maximum (FWHM) which is the range of wavelengths passed by the filter at a transmission value that is half of $T_{max}$. A band pass filter can have a FWHM of 10 nanometers (nm), 20 nm, 30 nm, 40 nm or 50 nm. A long pass filter selectively passes higher wavelength light as defined by a $T_{max}$ and a cut on wavelength. The cut on wavelength is the wavelength at which light transmission is half of $T_{max}$, when the wavelength increases above the cut on wavelength, transmission percentage increases and as wavelength decreases below the cut on wavelength transmission percentage decreases. A short pass filter selectively passes lower wavelength radiation as defined by a $T_{max}$ and a cut off wavelength. The cut off wavelength is the wavelength at which light transmission is half of $T_{max}$; as wavelength increases above the cut off wavelength, transmission percentage decreases and as wavelength decreases below the cut off wavelength transmission percentage increases. A filter can have a $T_{max}$ of 50-100%, 60-90% or 70-80%.

In embodiments, the system includes a precision mounting plate. A precision mounting plate may be fabricated with alignment surfaces, such as mounting pins, grooves, slots, grommets, tabs, magnets, datum surfaces, tooling balls, or other surfaces designed to accept subassemblies or modules of interest.

In an aspect is provided a genetic (e.g., nucleic acid) sequencing system, wherein the genetic sequencing system includes the imaging system (e.g., multi-depth confocal imaging system) as described herein. Genetic sequencing systems utilize excitation beams to excite labeled nucleotides in the DNA containing sample to enable analysis of the base pairs present within the DNA. High speed sequencing employs high velocity scanning to deliver excitation beams to the DNA fluorophores, to stimulate sufficient emission of reactive photons from the DNA sample to be detected by the image sensors. Many of the next-generation sequencing (NGS) technologies use a form of sequencing by synthesis (SBS), wherein modified nucleotides are used along with an enzyme to read the sequence of DNA templates in a controlled manner. In embodiments, sequencing comprises a sequencing by synthesis process, where individual nucleotides are identified iteratively, as they are polymerized to form a growing complementary strand. In embodiments, nucleotides added to a growing complementary strand include both a label and a reversible chain terminator that prevents further extension, such that the nucleotide may be identified by the label before removing the terminator to add and identify a further nucleotide. Such reversible chain terminators include removable 3' blocking groups, for example as described in U.S. Pat. Nos. 7,541,444 and 7,057,026. Once such a modified nucleotide has been incorporated into the growing polynucleotide chain complementary to the region of the template being sequenced, there is no free 3'-OH group available to direct further sequence extension and therefore the polymerase cannot add further nucleotides. Once the identity of the base incorporated into the growing chain has been determined, the 3' reversible terminator may be removed to allow addition of the next successive nucleotide. In embodiments, the genetic sequencing system utilizes the detection of four different nucleotides that comprise four different labels.

In embodiments, the genetic sequencing system utilizes the detection of four different nucleotides using fewer than four different labels. As a first example, a pair of nucleotide types can be detected at the same wavelength, but distinguished based on a difference in signal states, such as the intensity, for one member of the pair compared to the other, or based on a change to one member of the pair (e.g. via chemical modification, photochemical modification or physical modification) that causes apparent signal to appear or disappear compared to the signal detected for the other member of the pair. As a second example, three of four different nucleotide types can be detected under particular conditions while a fourth nucleotide type lacks a label that is detectable under those conditions, or is minimally detected under those conditions. Incorporation of the first three nucleotide types into a nucleic acid can be determined based on presence of their respective signals and incorporation of the fourth nucleotide type into the nucleic acid can be determined based on absence or minimal detection of any signal. As a third example, one nucleotide type can include label(s) that are detected in two different channels, whereas other nucleotide types are detected in no more than one of the channels.

In an aspect is provided a cell imaging system, wherein the cell imaging system includes the imaging system (e.g., multi-depth confocal imaging system) as described herein. Cell imaging systems utilize excitation beams to detect emissions (e.g., diffracted light, reflected light, refracted light) from a sample comprising a cell (e.g., a sample from a tissue of interest, or from a biopsy, blood sample, or cell culture. Non-limiting examples of samples comprising a cell include fluid or tissue from a subject, including, without limitation, blood or a blood product (e.g., serum, plasma, platelets, buffy coats, or the like), umbilical cord blood, chorionic villi, amniotic fluid, cerebrospinal fluid, spinal fluid, lavage fluid (e.g., lung, gastric, peritoneal, ductal, ear, arthroscopic), a biopsy sample, celocentesis sample, cells (blood cells, lymphocytes, placental cells, stem cells, bone marrow derived cells, embryo or fetal cells) or parts thereof (e.g., mitochondrial, nucleus, extracts, or the like), urine, feces, sputum, saliva, nasal mucous, prostate fluid, lavage, semen, lymphatic fluid, bile, tears, sweat, breast milk, breast fluid, the like or combinations thereof. Non-limiting examples of tissues include organ tissues (e.g., liver, kidney, lung, thymus, adrenals, skin, bladder, reproductive organs, intestine, colon, spleen, brain, the like or parts thereof), epithelial tissue, hair, hair follicles, ducts, canals, bone, eye, nose, mouth, throat, ear, nails, the like, parts thereof or combinations thereof. A sample may comprise cells or tissues that are normal, healthy, diseased (e.g., infected), and/or cancerous (e.g., cancer cells). A sample obtained from a subject may comprise cells or cellular material (e.g., nucleic acids) of multiple organisms (e.g., virus nucleic acid, fetal nucleic acid, bacterial nucleic acid, parasite nucleic acid).

In an aspect is provided a tissue imaging system, wherein the tissue imaging system includes the imaging system (e.g., multi-depth confocal imaging system) as described herein. Tissue imaging systems utilize excitation beams to detect emissions (e.g., diffracted light, reflected light, refracted light) from a sample comprising a tissue (e.g., a sample from a tissue of interest, or from a biopsy, blood sample, or cell culture).

In embodiments, the system (e.g., the genetic sequencing system, the cell imaging system, or the tissue imaging system) includes an integrated system of one or more interconnected chambers, ports, and channels in fluid communication and configured for carrying out an analytical reaction or process, either alone or in cooperation with an appliance or instrument that provides support functions. The reagent aspiration manifold and/or the reagent dispense manifold are in fluidic communication with a fluidic system. The fluid system may store fluids for washing or cleaning the fluidic network of the device, and also for diluting the reactants. For example, the fluid system may include various reservoirs to store reagents, enzymes, other biomolecules, buffer solutions, aqueous, and non-polar solutions. Furthermore, the fluid system may also include waste reservoirs for receiving waste products. As used herein, fluids may be liquids, gels, gases, or a mixture of thereof. Also, a fluid can be a mixture of two or more fluids. The fluidic network may include a plurality of fluidic components (e.g., fluid lines, pumps, aspirators, nozzles, valves, or other fluidic devices, manifolds, reservoirs) configured to have one or more fluids flowing therethrough. In embodiments, the system includes one or more peristaltic pumps. In embodiments, the system includes one or more syringe pumps. In embodiments, the support functions include at least one of sample introduction, fluid and/or reagent driving means, temperature control, detection systems, data collection and integration systems, and are configured to determine the nucleic acid sequence of a template polynucleotide (e.g., a target polynucleotide, optionally comprising a barcode). The device can use pressure drive flow control, e.g., utilizing valves and pumps, to manipulate the flow of reagents, molecules, or enzymes in one or more directions and/or into one or more channels of a device.

In an aspect is provided a method of imaging a cell sample (e.g., a tissue sample comprising a cell). In embodiments, the method includes providing a sample comprising a cell, illuminating the sample at a plurality of depths and detecting emissions from the sample (e.g., fluorescent excitation events, scattered light, transmitted light, or reflected light) at an active-pixel sensor array, and scanning the sample.

In embodiments, the method further a step of obtaining a two-dimensional or three-dimensional picture, image, video, or other representation of the physical form or structure of the sample. This representation can be obtained via light field, fluorescence, or other microscopic techniques. In embodiments, the method further includes an additional imaging modality or immunohistochemistry modality (e.g., immunostaining). Immunohistochemistry (IHC) is a powerful technique that exploits the specific binding between an antibody and antigen to detect and localize specific antigens in cells and tissue, commonly detected and examined with the light microscope. Known IHC modalities may be used, such as the protocols described in Magaki, S., Hojat, S. A., Wei, B., So, A., & Yong, W. H. (2019). *Methods in molecular biology* (Clifton, N.J.), 1897, 289-298, which is incorporated herein by reference. In embodiments, the additional imaging modality includes bright field microscopy, phase contrast microscopy, Nomarski differential-interference-contrast microscopy, or dark field microscopy. In embodiments, the method further includes determining the cell morphology (e.g., the cell boundary or cell shape) using known methods in the art. For example, determining the cell boundary includes comparing the pixel values of an image to a single intensity threshold, which may be determined quickly using histogram-based approaches as described in Carpenter, A. et al Genome Biology 7, R100 (2006) and Arce, S., Sci Rep 3, 2266 (2013)). Comparison of this representation with spatially resolved nucleic acid detection results can be used to localize genetic information with recognizable features of a tissue. Exemplary methods for spatial detection of nucleic acids that can be modified for use in the system and methods set forth herein are described in US 2014/0066318 which is incorporated herein by reference. In embodiments, the method includes obtaining two-dimensional planes of images by scanning along one axis (e.g., the z direction). For example, multiple two-dimensional planes may be acquired for the same sample in the xy plane whereby detection events may be occurring on different z-planes. In embodiments of the methods provided herein, the method includes imaging through each of the multiple two-dimensional planes at a resolution sufficient to distinguish one imaged plane from an adjacent imaged plane. In embodiments, the methods and devices described herein simultaneously obtain a plurality of depth-resolved optically sectioned images.

In embodiments, the method includes performing an additional image processing techniques (e.g., filtering, masking, smoothing, UnSharp Mask filter (USM), deconvolution, or maximum intensity projection (MIP)). In embodiments, the method includes computationally filtering the emissions using a linear or nonlinear filter that amplifies the high-frequency components of the emission. For example, USM method applies a Gaussian blur to a duplicate of the original image and then compares it to the original. If the difference is greater than a threshold setting, the images are subtracted. In embodiments, the method includes a maximum intensity projection (MIP). A maximum intensity projection is a visualization technique that takes three-dimensional data (e.g., emissions from varying depths obtained according to the methods described herein) and turns it into a single two-dimensional image. For example, the projection takes the brightest pixel (voxel) in each depth and displays that pixel intensity value in the final two-dimensional image. Various machine learning approaches may be used, for example, the methods described in Lugagne et al. Sci Rep 8, 11455 (2018) and Pattarone, G., et al. Sci Rep 11, 10304 (2021), each of which is incorporated herein by reference. In embodiments, the method includes focus stacking (e.g., z-stacking) which combines multiple images taken at different focus distances to give a resulting image with a greater depth of field (DOF) than any of the individual source images.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device. The methods and systems described herein can be implemented or performed by a machine, such as a processor configured with specific instructions, a digital signal processor (DSP), an application specific integrated circuit (ASIC), a field programmable gate array (FPGA) or other programmable logic device (PLD), complex programmable logic device (CPLD), a programmable logic array (PLA), programmable array logic (PAL), discrete gate or transistor logic, discrete hardware components, or any combination thereof designed to perform the functions described herein. A processor can be a microprocessor. A processor can also be implemented as a combination of computing devices, e.g., a combination of a DSP and a microprocessor, a plurality of microprocessors, one or more microprocessors in conjunction with a DSP core, or any other such configuration. The elements of a method or process as described herein can be implemented within computational hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art.

The computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores. The computer can run any one of a variety of operating systems, such as for example, any one of several versions of Windows, or of MacOS, or of Unix, or of Linux.

With certain aspects, to provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), the Internet, WiFi (IEEE 802.11 standards), NFC, BLUETOOTH, ZIGBEE, and the like.

The computing system may include clients and servers. A client and server are generally remote from each other and typically interact through a communication network. The relationship of client and server arises by virtue of computer programs running on the respective computers and having a client-server relationship to each other.

As used herein, the term "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about includes the specified value.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

The invention claimed is:

1. A multi-depth confocal imaging system, comprising:
at least one light source configured to provide excitation beams, wherein the at least one light source is coupled to optic fibers that introduce the excitation beams into the sample, wherein the optic fibers are grouped into at least a first bundle including a first plurality of optic fibers and a second bundle including a second plurality of optic fibers, wherein the first plurality of optic fibers defines a first single focus end at a first Z axis location relative to the sample, and wherein the second plurality of optic fibers defines a second single focus end at a second Z axis location relative to the sample, and wherein the first Z axis location is offset from the second Z axis location by an offset distance;
an objective lens, wherein the excitation beams are focused into a sample at a first plurality of focus depths along an excitation direction through the objective lens, the objective lens having an optical axis; and
an image sensor that receives emissions from the sample via the objective lens, wherein the emissions define foci relative to the image sensor at a second plurality of focus depths, wherein the image sensor is oriented at an oblique orientation relative to the optical axis of the objective lens.

2. The system of claim 1, further comprising a scanner element configured to scan the sample along a scan direction.

3. The system of claim 1, wherein the aspect of the image sensor is positioned at an oblique orientation relative to the optical axis of the objective lens so as to compensate for the second plurality of focus depths of the emissions relative to the image sensor.

4. The system of claim 1, wherein the light source is a laser, LED (light emitting diode), a mercury or tungsten lamp, or a super-continuous diode.

5. The system of claim 4, wherein the laser is a continuous wave (CW) laser or a pulsed laser.

6. The system of claim 1, wherein the light source provides excitation beams having a wavelength between 200 nm to 1500 nm.

7. The system of claim 1, wherein the light source is a laser.

8. The system of claim 7, wherein the laser provides excitation beams having a wavelength of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm.

9. The system of claim 1, wherein the image sensor comprises a complementary metal-oxide-semiconductor (CMOS) array, a charge-coupled device (CCD) array, an array of photodiodes, an array of avalanche photodiodes, an array of photomultiplier tubes (PMTs), or an array of optical fibers.

10. The system of claim 1, wherein the image sensor comprises at least one of a complementary metal-oxide-semiconductor (CMOS) array or a charge-coupled device (CCD) array.

11. The system of claim 1, wherein the image sensor is a camera.

12. The system of claim 1, wherein the light source is coupled through single-mode optical fibers.

13. The system of claim 1, wherein the second plurality of focus depths correspond to the first plurality of focus depths.

14. The system of claim 1, wherein the objective lens is an air objective lens.

15. The system of claim 1, wherein the objective lens comprises a numerical aperture of 0.1 to 1.65.

16. The system of claim 1, wherein the objective lens comprises a focal length of 1.6 mm to 50 mm.

17. The system of claim 1, wherein the oblique orientation of the image sensor corresponds to an oblique orientation defined by the second plurality of focus depths of the foci.

18. The system of claim 1, wherein the image sensor comprises an array of pixels that are oriented at the oblique orientation relative to the optical axis of the objective lens.

19. The system of claim 1, wherein the first single focus end and the second single focus end are each at fixed locations along the Z-axis.

20. A multi-depth confocal imaging system, comprising:
at least one light source; and
optic fibers that introduce excitation beams from the at least one light source into the sample, wherein the optic fibers are grouped into at least a first bundle including a first plurality of optic fibers and a second bundle including a second plurality of optic fibers, wherein the first plurality of optic fibers defines a first single focus end at a first Z axis location relative to the sample, and wherein the second plurality of optic fibers defines a second single focus end at a second Z axis location relative to the sample, and wherein the first Z axis location is offset from the second Z axis location by an offset distance and wherein the first Z axis location and the second Z axis location collectively define an oblique tilt angle that corresponds to an oblique tilt angle by which an image sensor is oriented relative to an optical axis of an objective lens.

21. The system of claim 20, further comprising at least one of a diffractive optical element and a micro-lens.

22. The system of claim 20, wherein the at least one light source comprises a plurality of lasers including a first laser having a first excitation wavelength and a second laser having a second excitation wavelength,
wherein each of the lasers is coupled to a respective splitter that splits light of each laser into multiple optic fibers including a first splitter that splits light of the first laser into a first optic fiber of the first bundle and a second optic fiber of the second bundle, and a second splitter that splits light into a third optic fiber of the first bundle and a fourth optic fiber of the second bundle.

23. The system of claim 22, wherein each bundle includes at least one optic fiber from each of the lasers.

24. The system of claim 22, wherein the each of the first splitter and the second splitter is a 1-5 splitter, and
wherein the optic fibers are further grouped into a third bundle including a third plurality of optic fibers, a fourth bundle including a fourth plurality of optic fibers, and a fifth bundle including a fifth plurality of optic fibers;
and wherein the first splitter further splits light of the first laser into the third bundle, the fourth bundle, and the fifth bundle, and wherein the second splitter further splits light of the second laser into the third bundle, the fourth bundle, and the fifth bundle.

25. A method of generating a two- or three-dimensional image of a sample, comprising:
introducing excitation beams into a sample along an excitation direction via optic fibers, wherein the optic fibers are grouped into at least a first bundle including a first plurality of optic fibers and a second bundle including a second plurality of optic fibers, wherein the first plurality of optic fibers defines a first single focus end at a first Z axis location relative to the sample, and wherein the second plurality of optic fibers defines a second single focus end at a second Z axis location relative to the sample, and wherein the first Z axis location is offset from the second Z axis location by an offset distance;
focusing a corresponding plurality of emissions on an image sensor, wherein the emissions are focused at a plurality of depths relative to the image sensor, and wherein the image sensor is oriented at an oblique angle relative to the excitation direction; and
scanning the sample along a direction orthogonal to the excitation direction to obtain a plurality of planar images of the sample, the planar images defining multiple depths of the sample.

26. The method of claim 25, wherein the image sensor is at least one of a complementary metal-oxide-semiconductor (CMOS) array and a charge-coupled device (CCD) array.

27. The method of claim 25, wherein at least one optic fiber is used to introduce excitation beams into the sample.

28. The method of claim 25, further comprising configuring the image sensor such that only a portion of pixels correspond to a diffraction limited spot size of foci on the image sensor is sensitive to photons to achieve confocal detection.

29. The method of claim 25, wherein the oblique orientation of the image sensor corresponds to an oblique orientation defined by the plurality of the focus depths of the excitation beams.

30. The method of claim 25, wherein the image sensor comprises an array of pixels that are oriented at the oblique angle to the excitation direction.

* * * * *